(12) United States Patent
Hsu

(10) Patent No.: US 6,441,342 B1
(45) Date of Patent: Aug. 27, 2002

(54) MONITOR FOR ELECTRIC ARC WELDER

(75) Inventor: Christopher Hsu, Mentor, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 64 days.

(21) Appl. No.: 09/716,803

(22) Filed: Nov. 20, 2000

(51) Int. Cl.[7] .............................................. B23K 9/095
(52) U.S. Cl. ............................ 219/130.01; 219/137 PS
(58) Field of Search ....................... 219/130.01, 130.21, 219/130.31, 130.32, 130.33, 130.5, 130.51, 137 PS; 228/103

(56) References Cited

U.S. PATENT DOCUMENTS

| | | | |
|---|---|---|---|
| 3,359,561 A | | 12/1967 | Shostek |
| 3,950,759 A | | 4/1976 | Ziegenfuss |
| 4,595,820 A | * | 6/1986 | Richardson ............ 219/130.01 |
| 4,605,836 A | * | 8/1986 | Retfalvi et al. ........ 219/130.01 |
| 4,721,947 A | * | 1/1988 | Brown ........................ 228/103 |
| 5,278,390 A | | 1/1994 | Blankenship |
| 5,305,183 A | * | 4/1994 | Teynor .................. 219/130.01 |
| 5,708,253 A | | 1/1998 | Bloch et al. |
| 6,051,805 A | | 4/2000 | Vaidya et al. |
| 6,051,810 A | | 4/2000 | Stava |
| 6,236,017 B1 | * | 5/2001 | Smartt et al. .......... 219/130.01 |

\* cited by examiner

*Primary Examiner*—Clifford C. Shaw
(74) *Attorney, Agent, or Firm*—Vickers, Daniels & Young

(57) ABSTRACT

A monitor for an electric arc welder as the welder performs a selected arc welding process by creating actual welding parameters, such as arc current and arc voltage, between an advancing welding wire and a workpiece, where the process involves an arc and is defined by a series of rapidly repeating wave shapes constituting a weld cycle with a cycle time, the wave shapes are each segmented into time states having command signals corresponding to the actual parameters and a time duration. The monitor selects a specific wave shape state, reads one of the actual parameters, compares the actual read parameter with a function of the command signal corresponding to the actual parameter, and uses-the comparison to generate a characteristic of the welding process during the selected state.

31 Claims, 16 Drawing Sheets

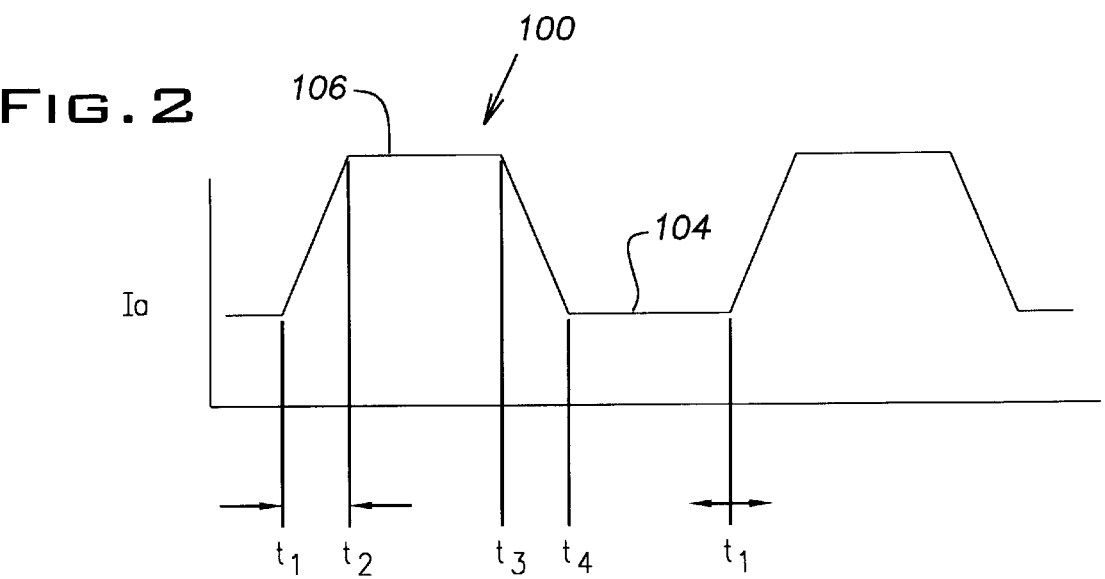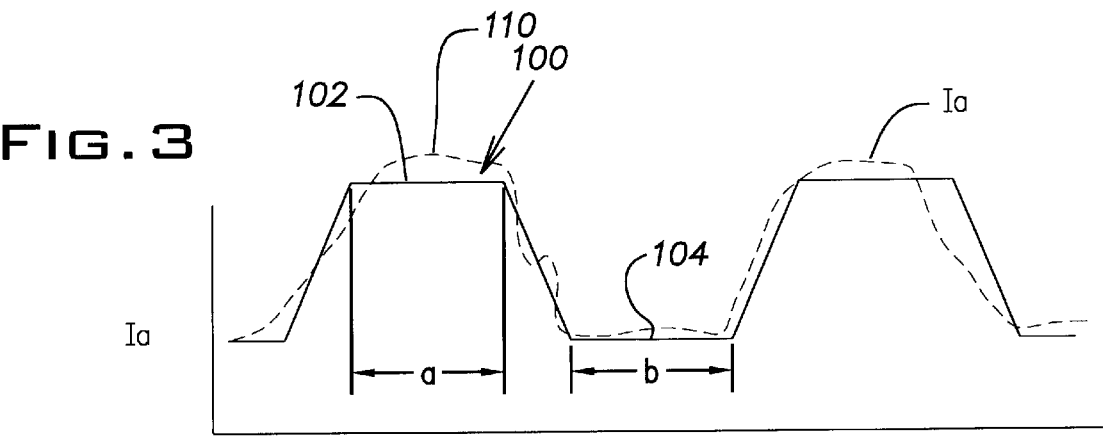

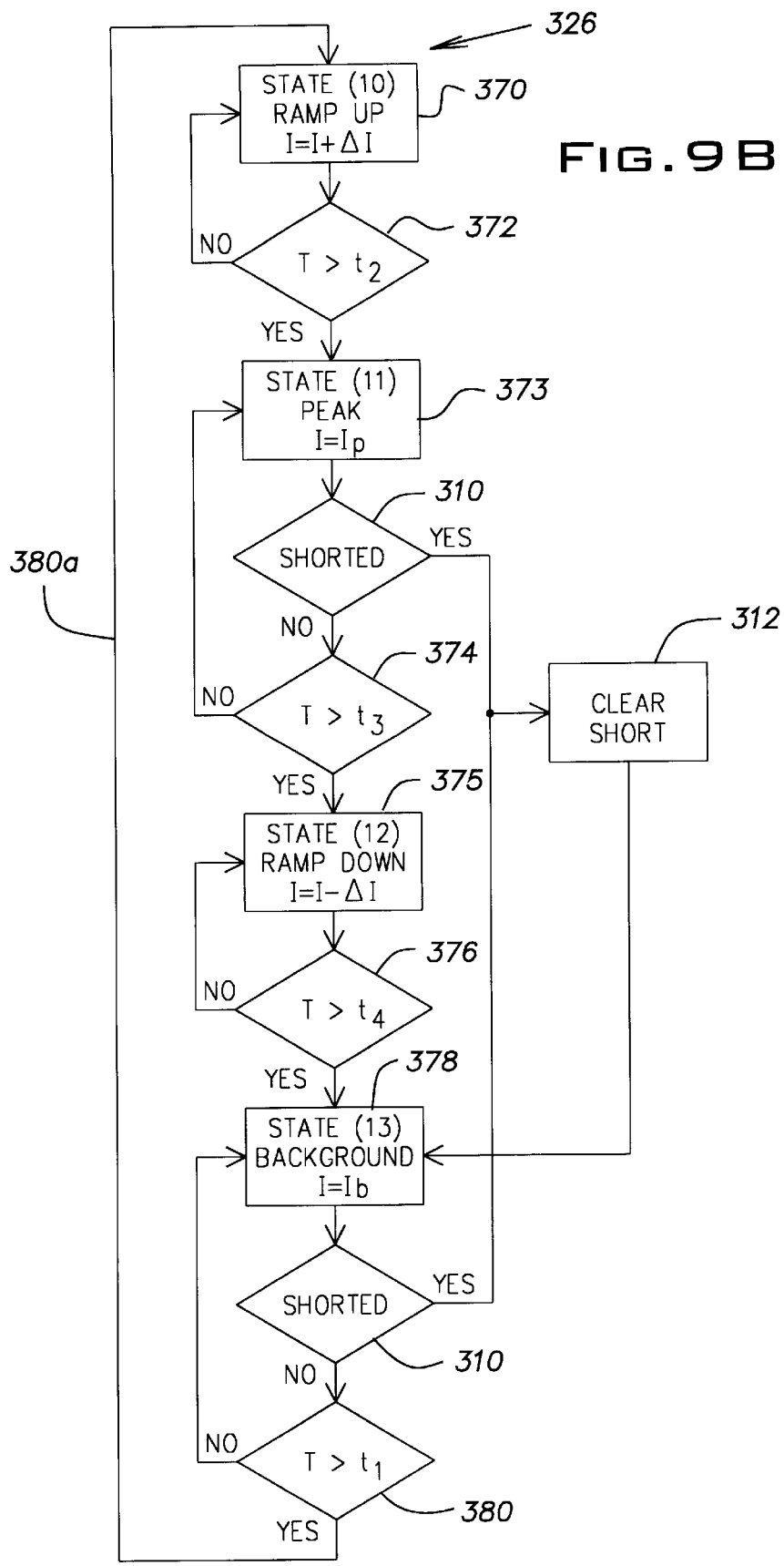

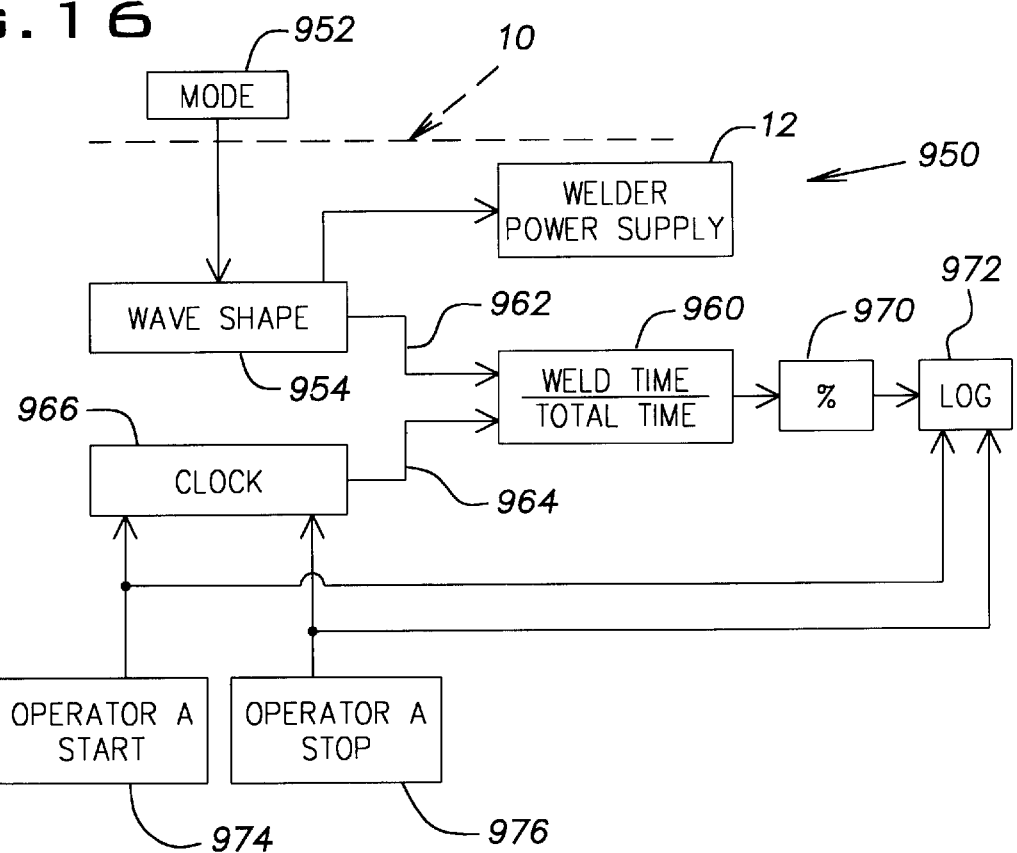
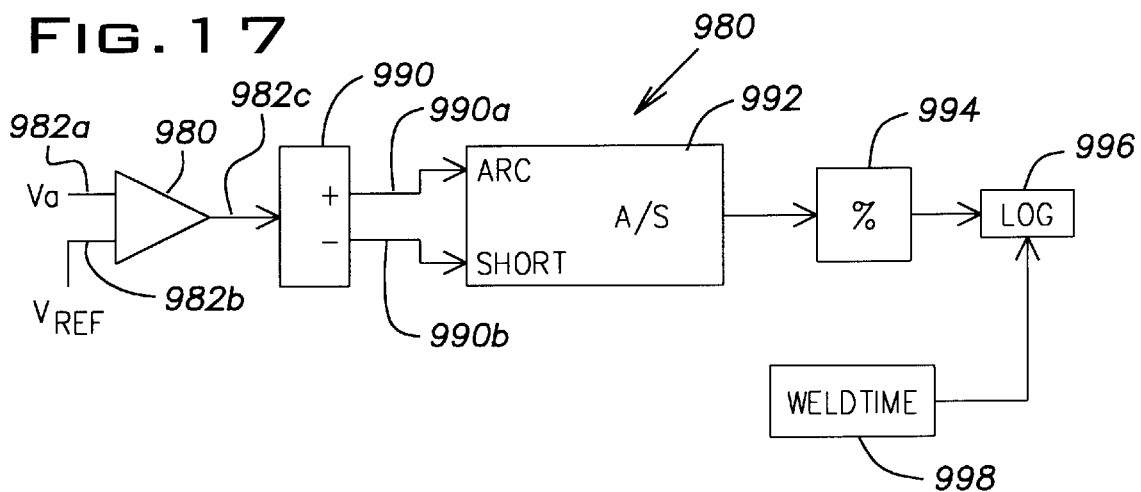

MONITOR FOR ELECTRIC ARC WELDER

The invention relates to the field of electric arc welding and more particularly to a monitor for monitoring the parameters and/or internal control signals of an electric arc welder during a welding cycle for the purpose of determining quality related characteristics of each welding cycle. Further, the invention relates to the method of monitoring an electric arc welder during a welding cycle to provide information regarding the actual performance of the welder during each welding cycle.

INCORPORATION BY REFERENCE

For many years welding companies and welding engineers have been intent upon recording electrical characteristics of the operating parameters implemented by electric arc welders during various welding processes. Ziegenfuss 3,950,759 is representative of many monitors for electric arc welders. This patent is incorporated by reference as background information. Through the years, a variety of time monitors have been employed for electric arc welders to determine the time during which a welding is actually being performed. To this end, it is common practice to provide a timer, or program to measure the time of welding compared to the time the welder is idle. Shostek 3,359,561 is representative of several patents for measuring the time that an electric arc welder is operated during a set period, such as a work shift in a manufacturing plant. Consequently, it is common knowledge that during the arc welding cycle a timer, counter or similar time accumulation device can record the relative time between welding and non-welding. For illustrative purposes Shostek 3,359,561 is incorporated by reference.

With the advent of computers, microprocessors and other digital processing devices, such devices either external or internal of the electric arc welder, are employed for the purposes of measuring and documenting the operation of an electric arc welder. Again, several publications show the state of the art for computerized monitoring of an electric arc welder. To avoid the necessity for detailed explanation of the background associated with computerized monitors, Bloch 5,708,253 is incorporated by reference. In accordance with control technology as used in the field of electric arc welders, it is also common practice to employ a central microprocessor for controlling the inverter forming the power supply and other ancillary appliances of an electric arc welding installation, as illustrated in Bloch 5,708,253. When disclosing the software procedure employed in monitoring electric arc welders it is common practice to set forth the program implementation as a series of steps performed by the computer microprocessor or similar digital manipulation devices. A representative example of such standard technologies is disclosed in Bloch 5,708,253, which is incorporated by reference herein to avoid the necessity of explaining the state of the art.

All of these background patents are representative in nature and merely explain the state of the art in monitoring electric arc welders by using computer technology when manipulating an arc welder by computer software.

A more recent disclosure of a computer of CPU control circuit to monitor an electric arc welder is illustrated in Vaidya 6,051,805. This patent discloses a system for monitoring several parameters in an electric arc welder, such as current, wire feed speed and gas flow, while using a computer to manipulate the measured characteristics of the parameters to generate information regarding the operation of an electric arc welder. As background information, Vaidya 6,051,805 is also incorporated by reference as background information and the state of the art.

The present invention is implemented on a Power Wave electric arc welder manufactured and sold by The Lincoln Electric Company of Cleveland, Ohio. A patent disclosing characteristics of this electric arc welder is Blankenship 5,278,390 incorporated by reference as showing a representative electric arc welder of the type used in practicing the present invention. Such welder, as shown in FIGS. 11 and 13, includes a wave form or wave shape generator to generate the series of rapidly repeating wave shapes constituting a weld cycle with a cycle time. Such wave shape generator is used for a variety of welding processes, such as pulse welding. The concept is also employed for a surface tension transfer short circuit welding process of the type disclosed in Stava 6,051,810. The Stava patent is also incorporated by reference as background information showing the use of a wave shape generator for generating the individual wave shapes that are outputted by an electric arc welder to create a weld cycle during a weld time, which is a total time that the welder is operating for a single welding process.

These many patents incorporated by reference herein illustrate the state of the art to which the present invention is directed, which state of the art is well known by manufacturers of electric arc welders as well as welding engineers implementing welding processes by arc welders.

BACKGROUND OF INVENTION

Manufacturers of electric arc welders have attempted to monitor operation of the welder to determine the quality of the weld and the efficiency of the welder during operation in a manufacturing facility. One of the latest attempts to monitor an electric arc welder is illustrated in Vaidya 6,051,805 where a computer or other programmed instrument is employed to monitor average current and the efficiency of the welding operation, which efficiency is expressed as the time welding is performed as a ratio of the total time of the work shift. In accordance with standard technology, this disclosed monitoring system includes a first control circuit which is in the form of a central processing unit with standard accessories such as RAM, EPROM, and CIA. A second control circuit is connected to the first circuit to input and output information during the monitoring procedure. The monitor gathers information over a period of time which is disclosed as extending over a few hours or up to 999 hours. The monitor determines welding efficiency and monitors time to determine average current and accumulated arc welding time for overall efficiency. In accordance with this patent, there is a capability of monitoring the current and wire feed speed, as well as gas flow during the welding procedure. All of this information is stored in appropriate memory devices for purposes of outputting to read the operating characteristics of the welder during the welding process. In this way, the productivity of the welder can be measured to calculate cost efficiency and other parameters. Monitoring of the electric arc welder, as suggested in this patent, has been attempted by other manufacturers to measure average current during a welding process. However, measuring average current, voltage wire feed speed or other parameters during a welding process and using this data for recording the performance of the welding operation has not been satisfactory. In the past, monitoring devices have no pre-knowledge of the parameters being monitored. They only have capability of monitoring that which is occurring, as opposed to comparing that which is occurring to a priori knowledge. Consequently, monitoring of parameters such as current voltage and even wire feed speed in the past, even using the advanced technology set forth in Vaidya 6,051,805, has been chaotic in response and incapable of determining the actual stability of the electric arc or whether the welding process is above or below desired parameter values. This information must be known for the purpose of rejecting a welding cycle and/or determining the quality of the weld performed during the welding cycle with desired accuracy. In summary, monitoring the operation of an electric arc welder when used for a variety of welding processes has not been satisfactory because there is no prior knowledge which can be used for the purposes of evaluating the welding process during its implementation. The high powered programming capabilities now available do not overcome the lack of a system for generating real time and accurate reading of the welder performance.

THE INVENTION

The present invention is directed toward a monitor and method of monitoring an electric arc welder as the welder performs a selected arc welding process that creates heretofore unobtainable information on the operation of the welder. Thus, use of standard, high power computer technology can be used on equally precise and intelligent data generated by the monitor. The inventive monitor and monitoring system employs known information during the welding cycle. The information is fixed and not varying. The monitor concentrates on specific aspects of the welding process to employ prior knowledge which is compared to actual performance. Thus, the stability and acceptable magnitudes or levels of a selected parameter is determined during a specific aspect of the welding process. The weld process is separated into fixed time segments with known desired parameters before monitoring. Then this data can be processed by any of the known computer techniques to evaluate aspects of the weld cycle.

In accordance with the invention the welding process is formed as a series of rapidly repeating wave shapes taken together to constitute the welding cycle with a cycle time. Each wave shape is created by a known wave shape generator used to control the operation of the electric arc welder. These wave shapes are divided into states, such as in a pulse welding process, a state of background current, ramp up, peak current, ramp down, and then back to background current. By dividing the known driving wave shape into states defined as time segments of the generated arc characteristics, any selected one of the states can be monitored by using the invention. Indeed, many states can be multiplexed. For instance, in the pulse welding process the state related to the peak current can be monitored. In accordance with the invention, that state of the welding process is monitored by being read at a high rate preferably exceeding 1.0 kHz. However, the invention is practiced at a reading rate as low as 100 Hz. Each of the actual welding parameters, such as current, voltage or even wire feed speed is detected many times during each peak current state of the wave shape used in the pulse welding process. In this manner, the ramp up, ramp down and even background current is ignored during the monitoring process of the individual state. Consequently, the peak current is compared with a known peak current. A function of the peak current can be used to detect variations in the actual peak current outputted from the electric arc welder. In the invention, a minimum level and a maximum level on the lower and higher side of the command peak current are used to determine the level of the peak current many times during each peak current state of the pulse weld wave shape. Whenever the current exceeds the maximum, or is less than the minimum, this event is counted during each wave shape. The total deviations or events are counted for a weld cycle. If this count is beyond a set number per wave shape or during the weld cycle, a warning may be given that this particular weld cycle experienced unwanted weld conditions. Indeed, if the count exceeds a maximum level the weld cycle is rejected. This same capability is used with a statistical standard deviation program to read the peak current many times during each peak current state of the wave shape to sense the magnitude of the standard deviation. In practice, the standard deviation is the RMS deviation calculation by the computer program. By using the present invention, the average peak current is calculated and recorded as well as the level conditions and the stability characteristics. In implementation of the present invention the root mean square of the current or voltage is also determined for each of the state being monitored, in the example the peak current state of a pulse wave shape. While the peak current level or standard elevation is monitored, the background current stage can be monitored by current level and duration.

The invention involves selecting a state in the wave shape and comparing the desired and known command signals for that state to the actual parameters of the welding process during that monitored state. The selection is based on a priori knowledge of waveform generator. For example, at specific WFS–WFS1, the waveform generator is programmed to adjust peak current to control arc length. The "informed" monitor then select peak current segment as the monitored state, when welding at this specific WFS1. At another WFS–WFS2, however, the waveform generator is programmed to adjust background time to control arc length (and not peak current). The "informed" monitor then select background time as monitored state and parameter, when welding at this new WFS. In contrast, a posteriori monitor has no idea that at different WFS, different aspect of waveform should be monitored to detect arc stability. Monitoring background time at WFS1, or monitoring peak current at WFS2 in this example, would be very ineffective. It is new to use a time segment of the wave shape for monitoring only this segment of the wave shape using prior knowledge of the desired values. This allows actual monitoring of the electric arc welding process and not merely an averaging over the total wave shape.

In accordance with the present invention, the monitor is characterized by the use of prior knowledge, as opposed to the normal process of merely reading the output parameters experienced during the welding process. Consequently, the monitoring greatly simplifies the task of detecting normal behavior of a welder when the normal behavior is a function of time and differs during only one aspect of the welding process. The invention is not as applicable to monitoring voltage in a constant voltage process, because the desired level of voltage is a known characteristic during the total weld cycle. However, in other welding processes when both the voltage and current vary during different segments of the wave shape, the present invention gives accurate readings of stability, RMS, standard deviation, average, below minimum and above maximum before the actual parameter being monitored during selected segments of the wave shape.

By using the invention, the time varying welding processes, such as pulse welding and short circuit welding, is monitored with precise accuracy and not by reading general output information. The monitor and system is activated at a selected time in each wave form which is the selected state or segment of the wave shape. The monitor compares actual parameters to the desired parameters in the form of command signals directed to the power supply of the welder. By using the present invention, monitoring can occur during only specific segments of the wave shape; however, in exceptional events, such as when the arc is extinguished or when there is a short circuit, a computerized subroutine is implemented by either voltage sensing or current sensing to restart the arc and/or correct the short. The subroutines for these events run parallel to the monitoring program. Consequently, these exceptions do not affect the overall operation of the monitor constructed in accordance with the present invention. These subroutines are constructed as exceptional states or time segments. The parameters or signals within these exceptional states are monitored in a similar fashion as disclosed above.

By using the present invention, production information over a calendar time, shift or even by operator can be accumulated for the purposes of evaluating the operation or efficiency of a welder. The monitoring of each weld cycle by monitoring a specific segment or state of the wave shape allows accumulation of undesired events experienced over time. This also allows a trend analysis so that the operator can take corrective actions before the welding process actually produces defective production welds. Trend analysis, defect analysis, accumulated defects, logging of all of these items and related real time monitoring of the electric arc welder allows direct intervention in a timely manner to take preventive actions as opposed to corrective actions.

The invention utilizes a wave shape generator allowing the wave shape to be divided into segments or states where the welding engineer knows the command signals for each of the specific segments. These command signals are created in accordance with the wave shape generator. An important aspect of the invention is the time segmentation of the welding signals or wave shapes into distinct states. This is a new concept for monitoring an electric arc welder. In the past, monitors were not set to known program behavior for a segment of the wave shape. Consequently, the present invention differs from prior art by employing time segmentation of the wave shape implemented to create a weld process. The wave shape for creating a weld process, is implemented from a generator that sets the constraints of each individual segment. These segments or states are monitored. Consequently, the inventive monitor is sensitive to the wave shape. The actual wave shape is processed but the monitor ignores certain aspects of the wave shape and monitors other aspects.

The present invention monitors a parameter during a certain time segment or state of the rapidly repeating pulses forming a total welding cycle. The monitoring is accomplished at a high rate such as over 1.0 kHz. In practice, for pulse welding the high rate of interrogation for monitoring is generally about 10 kHz. For short circuit welding, such as surface tension transfer, the interrogation rate is about 40 kHz. The current being monitored rapidly during the wave shape and the monitored voltage can be combined to produce a value representing watts, resistance and/or energy, when based upon time. The stability of these parameters can be determined by statistical standard deviation algorithm. By comparing the calculated parameter with a minimum/maximum level a level analysis is made. The novel monitoring concept is used to output the arc resistance, as well as the energy applied to the welding process during a specific segment or state of the many wave shapes constituting a total weld cycle. The ability to measure the resistance, watts, energy, voltage, and current over a specific portion of the wave shape during the actual welding process heretofore has not been possible. Such information is extremely important in quality control, maintenance and prediction of the characteristics of the welding process. By implementing rapid interrogation of a segment in the wave form, the instability of the parameter being monitored during that segment is determined by standard. deviation technology, such as an algorithm for RMS deviation. The welder alerts the operator and/or welding engineer when instability exist during a particular portion of the weld wave shape being performed. Instability is not weld quality, but it is a precursor of such quality allowing the operator and/or engineer to take corrective actions as the instability increases by the standard deviation readings during individual segments of the wave shape. Such instability is related to consistency. In turn, consistency of the weld process is related to weld quality and is predictive of the welding process being accomplished.

In accordance with the invention, the wave shape generator creates the wave shape being performed by the welder and the wave shape is segmented into states. During each state, the monitor reads the value of voltage and current many times at a rate exceeding 1 kHz. However, slower reading would still result in advantageous monitoring since a single segment is being monitored. The speed or rate of monitoring merely allows a more accurate depiction of momentary variations in the current or voltage. After measuring the current and voltage, the resistance, time variations and energy are available for comparison to a maximum and minimum level detector or for determining standard deviation. The level monitoring is related to the command signals for the time segment or state. Then determining stability by standard deviation, the command signal may be used as a datum or need not be used. Several segments are monitored during each welding cycle and are accumulated for the welding cycle to determine the overall weld characteristics and weld process performance of the cycle.

By using the present invention, the welder is commanded to create certain parameters at a certain level. The actual parameters are measured and compared to the threshold levels. Stability algorithms give a reading of stability. The output characteristics are generated for different states selected to be monitored. In the computer program different characteristics for the selected states are analyzed and outputted or stored. The invention uses commanded wave shapes for the purposes of segmenting the monitored data. The known commanded behavior is compared to the observed behavior for analysis by the monitor. Consequently, data segmentation of the wave shape reduces the chaotic output information heretofore obtained in monitors for electric arc welders. The data is obtained at a rate of at least about 1.0 kHz. In certain instances, as explained earlier, the data is collected at a rate of 10–40 kHz. Due to this rapid data acquisition rate, onboard processing of the data is preferred. Thus, the electric arc welder outputs hard copy or displaces on a screen the information processed by the monitor. The monitor uses a digital process device, such as a computer or microprocessor associated with the welder and having sufficient memory to store the information or to output statistical summaries of the information upon request. Such statistical summaries may be available rapidly or on an inquiry basis. By using prior knowledge and determining arc stability and performance, anticipated problems are avoided by correcting the welding process before defective welding is experienced.

The monitor of the present invention is also used to record wire feed speed during the welding cycle and control this speed. In addition, internal signals, such as the output of PID closed loop feedback controller, and the input to a pulse width modulator, are processed for statistical stability in a manner indicating the internal workings of the arc welder during the segmented monitoring. The monitor is used as a production monitor to register the time during welding for a time, such as a shift. The monitor is also used in a manner that does not generate rapid data measurement, but records time necessary for a state of the wave shape. In a short circuit welding process, the time during a short circuit is monitored to determine time variations during a welding cycle or from cycle to cycle. In a pulse weld process, the time during background current may vary at one wire feed speed. At another wire feed speed peak current may vary by design of the wave shape generator. Variations in these times are monitored by the present invention. Both the short and the background time are capable of being monitored because the wave shape is segmented. Thus, an important aspect of the invention is the segmentation of a known wave shape to develop data which is analyzed for the purposes of predicting and/or correcting the arc welding process. The background time variations in a pulse welding process is due to stick out changes and the time variations in short circuit welding is due to droplet size changes and weld pool movement. Thus, using the present invention statistical variations of time in background or time in short circuit provides information on arc stability that is monitored.

In summary, the invention monitors the operation of an electric arc welder by rapidly interrogating or reading the value of a welding parameter during a segmented state of the wave shape. The results of this rapid read, interrogation or "look" at the welding parameter are then stored for display externally or internally and, more importantly, are analyzed to monitor the welding process during a weld cycle and/or during a manufacturing shift. The analysis is by standard deviation such as a root mean square deviation for providing arc stability information. In practice "standard deviation" is performed as the absolute deviation. In accordance with another aspect, the rapid reading during the wave shape state is analyzed from a level standpoint by comparison with a set level employed during the state. In the level determination, one aspect involves determining the number of times that the read or interrogated parameter value exceeds a preset maximum. In another aspect of the inverter, when the data read by the monitor is less than a preselected minimum the transition is recorded. By counting the number of transitions beyond the preselected minimum or maximum levels, the quality of the weld can be monitored either during the weld cycle or over a given period of time. In this manner, any drift of the welding parameter is detected in advance of an actual rejection.

The invention is used to monitor arc stability in weld development using synergistic and non-synergistic procedures. When a parameter is changed, the invention will determine if the change corrects stability or increases arc instability. By using the monitoring system of the invention, arc stability is determined as the welding process is changed or during the operation of a welding cycle. In this manner, the invention provides a diagnostic tool to analyze the wave shape by focusing on specific states making up the wave shape. The monitored parameters of the weld operation are current, voltage, global scale factor (GSF), time and their statistical characteristic. GSF is the output of a feedback closed loop controller used for arc length regulation, for example, a PID digital filter or error amplifier. Quantitative determination, specification and comparison of the arc quality and the various welding conditions is made possible by using the present invention. The invention provides information on the manner by which repeatable wave shapes are implemented during a total weld cycle.

The primary parameters monitored by the present invention are time, arc current, arc voltage and global scale factor. These parameters are analyzed for the purposes of stability over a total weld cycle on an average basis or on a stability basis. A minimum level and a maximum level monitoring is conducted by using the present invention. Although the total weld cycle of rapidly repeating wave shapes is monitored, the actual monitoring process is performed on a selected portion of each weld shape. By focusing on the individual states, in a total weld shape, variations during the selected state provide extremely high sensitivity and tremendously high level of real time knowledge and data.

The parameter being monitored is read many times during the state of a wave shape being monitored; however, the monitored state in practice should exceed 0.2–0.4 ms and the monitor rate or rate of reading data is generally greater than 10 kHz. By using the invention, the analyzed parameter during a selected state of the wave shape can be used to pass or reject a weld cycle. In accordance with an aspect of the invention, a warning signal is provided after a preselected number of deviations, but before a weld reject condition has been reached. Since arc stability is monitored during each state of the wave shape, the average stability of the entire weld is obtainable. Stability is read with a scale of 0–100, where 100 is the most stable arc.

Stability is calculated by an algorithm. In a pulse welding process as shown in FIGS. 2, 3, and 9A, the background current is monitored as a time segment of the wave shape. This segment is between $t_4$ and $t_1$. The mean background current $\bar{x}$ is:

$$\bar{x} = \frac{1}{N}\sum_{j=1}^{N} x_j$$

where N is the total count of background current states.
Standard deviation SD is:

$$SD = \sqrt{\frac{\sum_{j=1}^{N}(x_j - \bar{x})^2}{N-1}}$$

The unitless number known as the coefficient of variation CV is:

$$CV = \frac{(100)(SD)}{\bar{x}}$$

Stability=100−CV.

Consequently, the most stable background current is where the stability is 100. This same calculation is used for all segments being monitored.

In one aspect of the invention, absolute deviation is used as opposed to statistically standard deviation. The invention counts the times that a stability signal of a wave shape state is below the acceptable stability for welding. These transient counts are accumulated to determine whether the weld passes or fails. These analytical techniques employ the invention.

The invention is capable of performing several diverse procedures heretofore not obtainable with a high accuracy. For instance, running indication of absolute deviation of a parameter is provided. The invention also utilizes a running average indication that is updated while the welding data is being monitored. Maximum absolute deviation on a per weld basis is displayed for evaluation. Further, an indication of the average absolute deviation on a per weld basis is displayed. The new monitor logs the absolute deviations calculated for each weld. This information indicates arc stability. Other uses of the data obtained by the invention are within the skill of the art.

An object of the invention is the provision of a monitor capable of performing the functions herein stated.

In accordance with the invention, there is provided a device for monitoring an electric arc welder as it performs a selected arc welding process by creating actual welding parameters, such as arc current and arc voltage, between an advancing welding wire and a workpiece. The welding process is defined by a series of rapidly repeating wave shapes constituting a weld cycle with a cycle time. The wave shapes are segmented into states having command signals corresponding to the actual parameters to be processed during the time segment and a state time duration which may be fixed or variable. The monitor selects a specific state, reads one of the actual parameters periodically at a rate greater than 1 kHz and compares the actual parameter reading with a function or value of the command signal corresponding to the one of the actual parameters. This comparison generates an arc characteristic attributed to the selected state. The actual parameter during a state in the preferred embodiment, is analyzed stability as determined by the standard deviation. The parameter is also monitored for level deviations. After the stability has been determined by reading the standard deviation of the parameter during a particular state, the deviation of all states during a weld cycle are accumulated. This determines the total stability of the particular state being monitored.

In practical implementation of the invention, the stability from various signals are combined on a "time contribution" method. In this method, the more accumulated time in state, the more weight is given to the signal. If multiple signals have the same state, the weights are equally distributed. This concept is illustrated in the following example.

In pulse welding, the peak time and background time are monitored for stability. Where $t_B$ is the background current time and $t_P$ is the peak current time:

The total background time $T_B$ is:

$$T_B = \sum_{i=1}^{N} t_B$$

The total peak time $T_P$ is:

$$T_P = \sum_{i=1}^{N} t_P$$

In the algorithm, stability of the peak current is:

$$100 - \frac{(CV_{t_B})(T_B) + (CV_{t_P})(T_P)}{T_B + T_P}$$

In general:

$$Stability = 100 - \frac{\sum_{i=1}^{K} CV_i^* T_i}{\sum_{i=1}^{K} T_i}$$

where i is the enumerator of the participating channel and K is the number of participating channels. If multiple channels share the same state, $T_i$ will be equally distributed among these channels. For example, both background current (BC) and background time (BT) contribute to the stability, as follows:

$$Stability = 100 - \frac{CV_{BC}\left(\frac{T_B}{2}\right) + CV_{BT}\left(\frac{T_B}{2}\right)}{\frac{T_B}{2} + \frac{T_B}{2}} \quad \text{or}$$

$$Stability = 100 - \frac{CV_{BC} + CV_{BT}}{2}$$

The standard deviation of a state during a weld cycle indicates quality of the welding cycle. In accordance with another aspect of the invention, transition of the actual rapidly read parameter values with respect to a minimum or maximum level is detected and accumulated. The number or existence of transitions above the minimum or below the maximum level is indicative of the weld quality. By recording either stability of a parameter or level deviations of a parameter from weld cycle to weld cycle, the system of the invention detects trends in the welding operation allowing corrective action before actual defective welding is experienced.

In accordance with the present invention, a number of readings are performed during the selected time segment or state of each successive wave shape. In practice this rate is substantially greater than 1 kHz and is preferably about 10 kHz for pulse welding. In short circuit welding, it has been found that the preferred rate of reading parameters is in the neighborhood of 40 kHz.

In accordance with another aspect of the present invention, there is provided a monitor for an electric arc welder as it performs a selected arc welding process for creating actual weld parameters between an advancing welding wire and workpiece. The process is controlled by command signals to the power supply of the welder. This monitor is controlled by a wave shape generator for creating a series of rapidly repeating wave shapes constituting a weld cycle. The wave shapes each are segmented into time states. The monitor measures and records level deviations of the selected weld parameter during a selected one of the time states. The use of a wave shape generator for controlling the power supply allows division of the wave shape into states wherein level deviations of a parameter used in the welding is monitored. In accordance with another aspect of the present invention, the level deviation set forth in the inventive statement above is replaced by a statistical deviation measurement of a weld parameter. Standard deviation is recorded for a selected one of the states to determine stability of the welding operation.

Still a further aspect of the present invention is monitoring an electric arc welder as the welder performs a selected arc welding process by creating actual welding parameters between an advancing wire and a workpiece. The weld process is controlled by command signals to the power supply of the welder in the form of a series of rapidly repeating wave shapes divided into functional states. Level deviations of a selected weld parameter are detected at a selected rate during one of the selected states and the results are accumulated over the total weld time. In accordance with this aspect of the invention, stability of a selected weld parameter is monitored during one of the functional states for the total weld time. By either level detection or stability measurement, the operation of the welding process is monitored during each weld cycle or during a time shift period, such as a day or otherwise.

In accordance with another aspect of the present invention there is provided a method of monitoring an electric arc welder as the welder performs a selected arc welding process by creating an internal signal for controlling the power supply or the wire feed speed of the welding wire as it is advancing toward the workpiece. The internal signal, which can be the input to a pulse width modulator, is monitored to measure the stability of the internal signal during one of the states of the segmented wave shape. These internal signals of the arc welder are also interrogated at a rapid rate to generate an indication of stability by a standard deviation, or absolute deviation, of the internal signal during the selected time segment or state of the wave shape.

The primary object of the present invention is the provision of a monitor or monitoring method which utilizes the concept of generating wave shapes rapidly for controlling the power supply wherein the wave shapes are segmented into time states. The time states of successive wave shapes are monitored so the total wave shape is not monitored.

Yet another object of the present invention is the provision of a monitor and monitoring system, as defined above, which monitor and system repeatedly reads an output parameter, such as current or voltage during a segment of each wave shape to create a stability reading, such as a standard deviation, and a level reading relating to level transitions of the weld parameter at individual reading steps.

Another object of the present invention is the provision of a monitor and monitoring system, as defined above, which monitor and monitoring system is used to create a large number of output readings of a characteristic of the welding process where the weld characteristic is used during the welding process for measuring the performance, maintaining, and adjusting the electric arc welder.

Still another object of the present invention is the provision of a monitor and monitoring system for an electric arc welder, which monitor and monitoring system monitors precise portions of the wave shapes used to control the welder. Thus, the monitor accuracy is drastically increased since it contains substantial real time data based upon prior knowledge.

These and other objects and advantages will become apparent from the following description taken together with the accompanying drawings.

BRIEF DESCRIPTION OF DRAWINGS

FIG. 2 is a current command graph from a wave generator showing the command wave shape divided into time segments or states of both fixed and variable durations;

FIG. 3 is a current graph of the actual command signals for arc current with the actual arc current parameter superimposed in dashed lines;

FIG. 9B is a computer flow chart showing the process implementation of the present invention for a pulse weld logic as shown in the block at the bottom of FIG. 9;

FIG. 13A is a partial current curve of the wave shape shown in FIG. 12 illustrating the rapid rate of measuring or reading the actual parameter during the plasma boost portion of the STT wave shape;

FIG. 16 is a flow chart of the use of the present invention for production efficiency;

FIG. 17 is a block diagram flow chart for logging the relationship between the arc and the short issued during a short circuit welding process, as an accessory to the invention; and, FIGS. 18 and 19 are simplified programs illustrating the broad aspects of the monitor of the present invention.

PREFERRED EMBODIMENT

Figure 1:
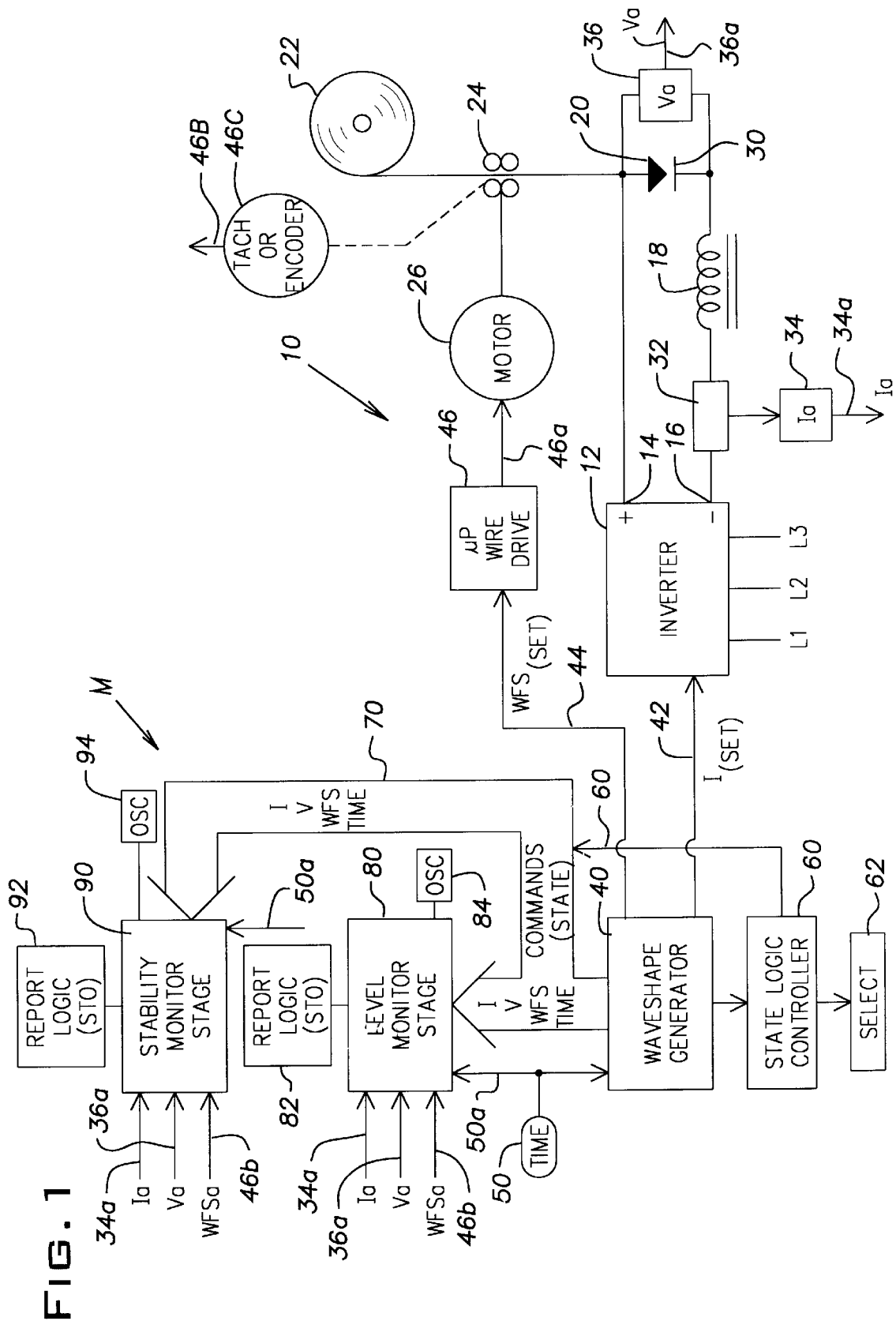
FIG. 1 is a combined block diagram and computer flow chart or program illustrating the preferred embodiment of the present invention.

Referring now to the drawings wherein the showings are for the purpose of illustrating the preferred embodiment of the invention and applications employing the invention, FIG. 1 shows a block diagram and flow chart or program implemented by a standard onboard computer in electric arc welder 10. In practice, welder 10 is a Power Wave, inverter based electric arc welder sold by The Lincoln Electric Company of Cleveland, Ohio. In accordance with standard technology, welder 10 includes a three phase electrical input L1, L2, L3 directing electrical current to power supply 12.

An onboard computerized controller operates the inverter based power supply to create a positive potential at terminal 14 and a negative potential at terminal 16. Selected arc welding processes are performed by directing a selected previously determined wave shape to the actual welding circuit, shown to have a standard smoothing inductor 18. Welder A performs the electric arc welding process between an advancing welding wire 20 from reel 22 driven at a desired rate by feeder 24 operated at the speed of motor 26. Heat of the arc melts wire 20 and workpiece 30 to deposit molten metal from the wire onto the workpiece. To monitor the actual parameters of the welding process, shunt 32 provides output signal $I_a$ from block 34 on line 34a. This signal is representative of the actual arc current at any given time. In a like manner, the voltage between wire 20 and workpiece 30 is sensed by block 36 so the output $V_a$ on line 36a is the instantaneous arc voltage to constitute a second weld parameter. The weld parameters illustrated in FIG. 1 are the actual arc current $I_a$ and the actual arc voltage $V_a$. Another parameter controlled for practicing the invention is wire feed speed (WFS), caused by rotation of the motor 26. Consequently, the three externally readable welding parameters of the welding process are arc current $Ia$ in line 34a, arc voltage $V_a$ in line 36a and the wire feed speed WFS readable in line 46b, as explained later. The wire feed speed (WFS) in line 46b is read by tachometer or encoder 46c connected to the drive rolls 24 of the feeder gear box or, alternatively, on a passive wheel attached to the wire to read WFS. In FIG. 1, the tachometer is shown as driven by the feed rolls. It could be driven by the output shaft of motor 26. The Power Wave electric arc welder includes a wave shape generator to create a series of rapidly repeating wave shapes constituting a weld cycle with a cycle time. Cycle time is the time of each wave shape. Power Wave welder A is shown in Blankenship 5,278,390 wherein the welder controls the individual wave shape to be outputted by power supply 12 through command line 42 and the speed of motor 26 through command line 44. Command line 44 has a signal which is recognized by the microprocessor on the wire drive control 46 of motor 26 to output the motor voltage drive PWM pulses in line 46a. In practice, the information on line 44 is digital and the command signal on line 46a is analog. Wave shape generator 40 creates digital signals in lines 42, 44 to controlling the desired welding process to be performed by welder 10. The external parameters $I_a$, $V_a$ and WFS can be read by appropriate monitoring devices. In the prior art, such parameters are read to indicate the general performance of the welder. However, the invention utilizes a completely unique and different monitoring concept not based upon a reading of a parameter over the total weld process.

In accordance with the invention, a logic state controller 60 divides or segments each of the outputted wave shapes into a series of time segmented portions or states. Monitor M which is a program loaded into the computer of welder 10 to read parameters during one selected segment of the wave shape. The portion of the wave shape being monitored is determined by the position of state selector 62. Indeed, monitor M monitors various time segments or states of the wave shape outputted by generator 40. In practice, selector 62 selects several of the time segments forming the wave shape and outputs the various states into the command interface 70. Consequently, command interface 70 causes measurement of the parameters during selected time segments of each wave shape outputted by the generator. Information or data on interface 70 includes the state or states being monitored and the particular commanded level of the various output parameters $I_a$, $V_a$, and/or WFS. Interface 70 of monitor M contains the data recognizing the particular state being processed together with the command levels for the weld parameters being read. The data in interface 70 is analyzed by level stage 80 to determine the relationship of a parameter on a level basis. The actual parameters are compared with the command parameters during selected states of the wave shape from generator 40. During a particular segment or state of the wave shape, level monitor stage 80 reads the actual parameters in lines 34a, 36a and 46b. These instantaneous values of the actual parameters are stored in internal memory, identified as the report logic 82. The reading of the actual parameters occurs rapidly as indicated by oscillator 84, which in practice causes a reading of the actual parameters at a rate of 10 kHz for pulse welding. It has been found that STT welding is read at a rate of 40 kHz. The rate can be adjusted; however, the higher the rate the better the sensitivity of the level measurement. Level monitor 80 also determines deviation of the actual welding parameters from either a minimum or maximum level. In this manner, not only can the actual values be stored, but data is stored representing deviation of the actual reading of the parameter for a given state as compared to a minimum level or to a maximum level. Report memory or logic 82 records deviation from a set level during a given state of the wave shape, as well as the actual level during the selected state of the wave shape. For a total weld cycle, these readings are accumulated, counted or otherwise processed to determine the quality of the welding and any trends toward weld defects.

Stability monitor stage 90 reads the actual welding parameters on lines 34a, 36a and 46b at a rate determined by oscillator 94 driven at a rate above 1 kHz and preferably above 5 kHz. Stability monitor stage 90 analyzes the actual weld parameters for standard deviation or absolute deviation during a state of the wave shapes being outputted. Of course, a few wave shapes can be skipped when using either monitor stage 80 or monitor stage 90. In the preferred embodiment, after a start sequence, all of the wave shapes are monitored for analyzing the actual welding parameters during the various selected states of the wave shape. Several states of a given wave shape in a welding process are monitored and the results are recorded separately for each state to be analyzed for level conformity, trend and stability. When measuring stability, standard deviation algorithm is used in monitor M to evaluate $I_a$, $V_a$ and/or WFS. This information is available to analyze each of the various segments of the weld shape over a total weld cycle for a given weld time. In practice, certain states, such as the peak current during a pulse wave shape are monitored to determine the stability and level deviations of the pulse welding process. In an STT welding process, monitor M records short circuit times for each wave shape, since these segments vary in time according to the external conditions of the welding process. Variation in short circuit time informs the welding engineer of adjustments to be implemented.

In accordance with the invention, the series of rapidly repeating wave shapes generated by the standard wave shape generator 40 are divided into time states, as shown in FIGS. 2 and 3. The output current command wave shape is pulse wave shape 100 with a peak current 102 having a fixed duration of time segment a shown in FIG. 3 and a background current 104 with a variable time duration for segment b shown in FIG. 3. The wave shape is divided into segments at times $t_1$–$t_4$ so that the command interface 70 receives the particular state being processed by generator 40 at any given time. As shown in FIG. 3 by the dashed line 110, the actual arc current from shunt 33 in FIG. 1 deviates from the command current signal of wave shape 100. During the selected functional states, such as states a or state b, the actual arc current $I_a$ is read at a rate determined by oscillator 84 or oscillator 94. In practice, this is a single software oscillator. Level monitor stage 80 records deviation in the ordinate direction between the actual parameter 110 and the command level of wave shape 100. During the selected state, stability monitor stage 90 reads the statistical standard deviation of the actual parameter. States a and b are normally monitored for a pulse welding process. However, the ramp up state between $t_1$–$t_2$ and/or the ramp down state during $t_3$–$t_4$ can be monitored to control or at least read the activity of the actual parameter during these states of the wave shape. As illustrated, the background time segment b has a variable time, as shown by the variable time positions of time $t_1$. Consequently, the state being monitored can have a fixed time duration or a variable duration. When a variable duration, the state is monitored until the end of the duration. Report logic 82 senses this as a level from one time, i.e. $t_4$ to the successive time, i.e. $t_1$. As the time $t_1$ changes with respect to the time $t_4$, this time of each wave shape is recorded as a level which is compared to a known time, obtained from interface 70 by selection of the welding mode of generator 40.

Figure 4:
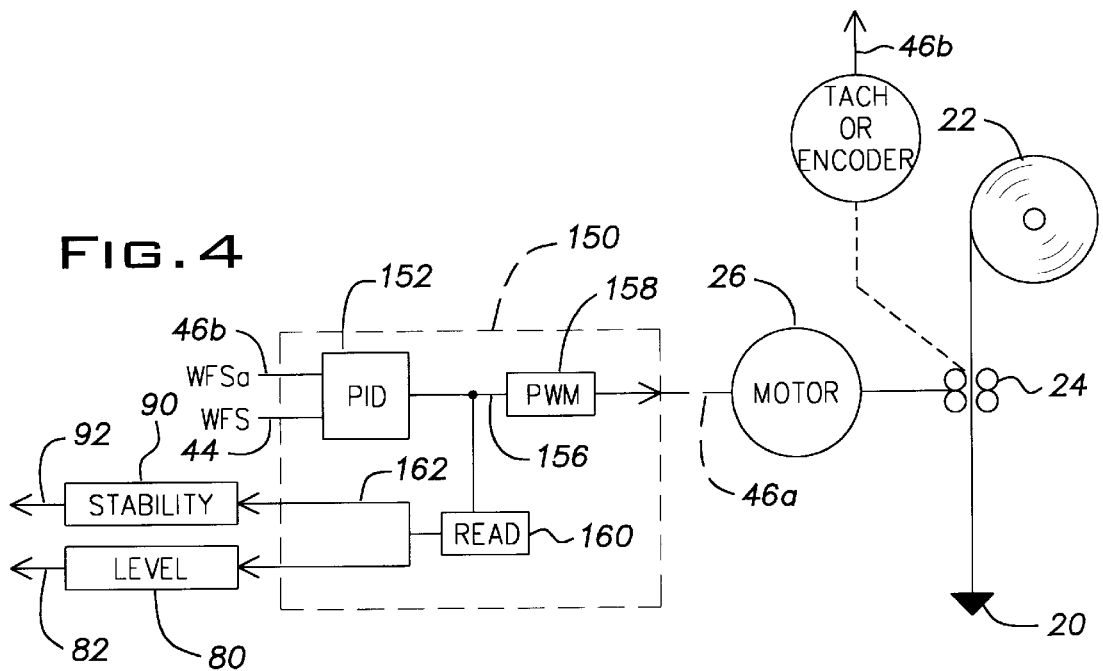
FIG. 4 is a block diagram of an aspect of the invention for monitoring signals internal of the welder instead of weld parameters as illustrated in FIGS. 2 and 3.
Figure 5:
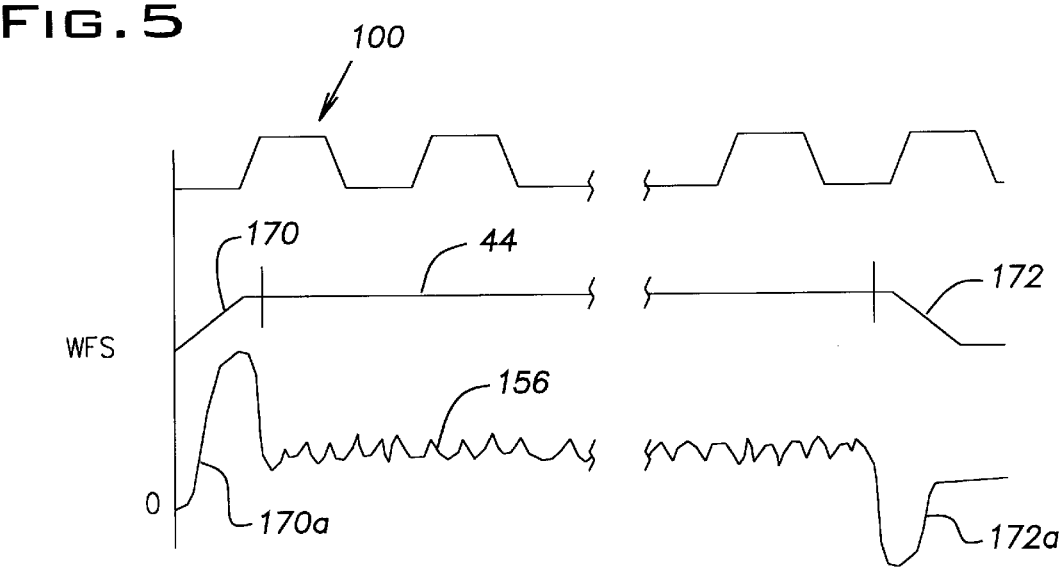
FIG. 5 is a time based graph illustrating the wave shape, wire feeder command signal and actual wire feeder command signal as experienced in the implementation of the invention shown in FIG. 4.

Monitor M monitors the actual welding parameters during specific selected states of the wave shapes; however, the monitor also has programming to operate the computer to determine the stability and/or level characteristics of an internal signal, such as the actual input to motor 26 on line 46a. Such internal monitoring of the signal on line 46a is set forth in the flow chart shown in FIG. 4 utilizing the signals shown in FIG. 5. The microprocessor in the wire feeder includes a subroutine that is a PID comparing network similar to an error amplifier. This PID comparator is schematically illustrated as block 152 in FIG. 4 having a first input 154 which is a digitized signal representing the actual arc voltage and a command signal on line 44. The output 156 of the PID is the voltage level at the input of the pulse width modulator 158 which is digitized in the microprocessor of the feeder. The output of the pulse width modulator is the command signal on line 46a to motor 26 for controlling the wire feed speed of feeder 24. In accordance with an aspect of the invention, monitor M includes the process program as schematically illustrated in FIG. 4 wherein the signal on line 156 is read by processing block 160 and the results are outputted on line 162 to the input of the level monitor stage 80 and/or the stability monitor stage 90, as previously discussed with respect to the invention as disclosed in FIG. 1. Consequently, an internal signal on line 156 is read at a rapid rate, exceeding 1 kHz, to check the level of this internal signal and/or the stability of this signal. As illustrated in FIG. 5, the wave shape 100 for pulse welding extends as a succession of wave shapes from generator 40. With respect to the wire feed speed, the command signal from generator 40 on line 44 takes the form shown in FIG. 5. It includes a start ramp up portion 170 and an ending ramp down portion 172. These two portions cause a drastic increase or decrease in the command signal on line 44. Between these abnormal command portions of the signal on line 44, there is a generally level wire feed speed command which is employed for the purposes of testing stability and/or the level deviation of this internal signal on line 156. In FIG. 5, the wire acceleration portion 170 is held until the speed is stabilized. This time is also monitored. Other internal signals not observable in a posteriori monitor are monitored by the present invention using the same concept as shown in FIGS. 4 and 5. The level monitor stage determines if the signal on line 156 exceeds the minimum or maximum for a prolonged time. For the wire feeder, this normally indicates a jam in the feeder system.

Figure 6:
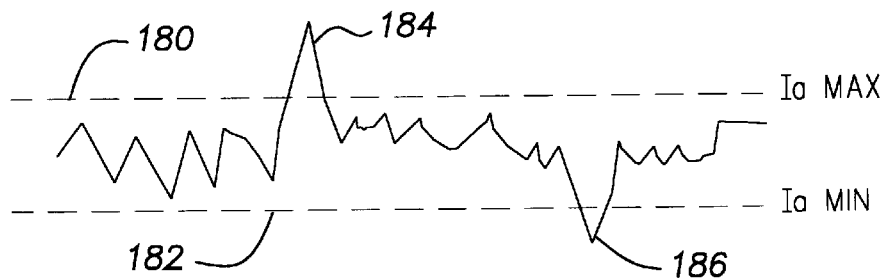
FIG. 6 is a portion of a parameter curve illustrating the level monitoring feature of the present invention.

FIG. 6 shows the concept of a level monitor stage wherein threshold 180 is the maximum parameter level and threshold 182 is the minimum parameter level. When the parameter, illustrated as arc current, exceeds threshold 180 as indicated by transient 184, there is a recorded event of over current. In a like manner, when the current is less than the minimum level 182, as shown by transient 186, there is recorded an under current event. These events, as will be described later, are counted to provide the output of the level monitor stage 80 as shown in FIG. 1. Consequently, the level monitor stage detects excursions 184 above a preset threshold and excursions 186 below a preset level. These levels are set by the particular state in the interface 170. Some states of a wave shape employ the level monitor stage with thresholds and other states of the same wave shape may use the stability monitor stage. Preferably, and in practice, both monitor stages are used for the selected state or states of the wave shape being interrogated by monitor M.

Figure 7:
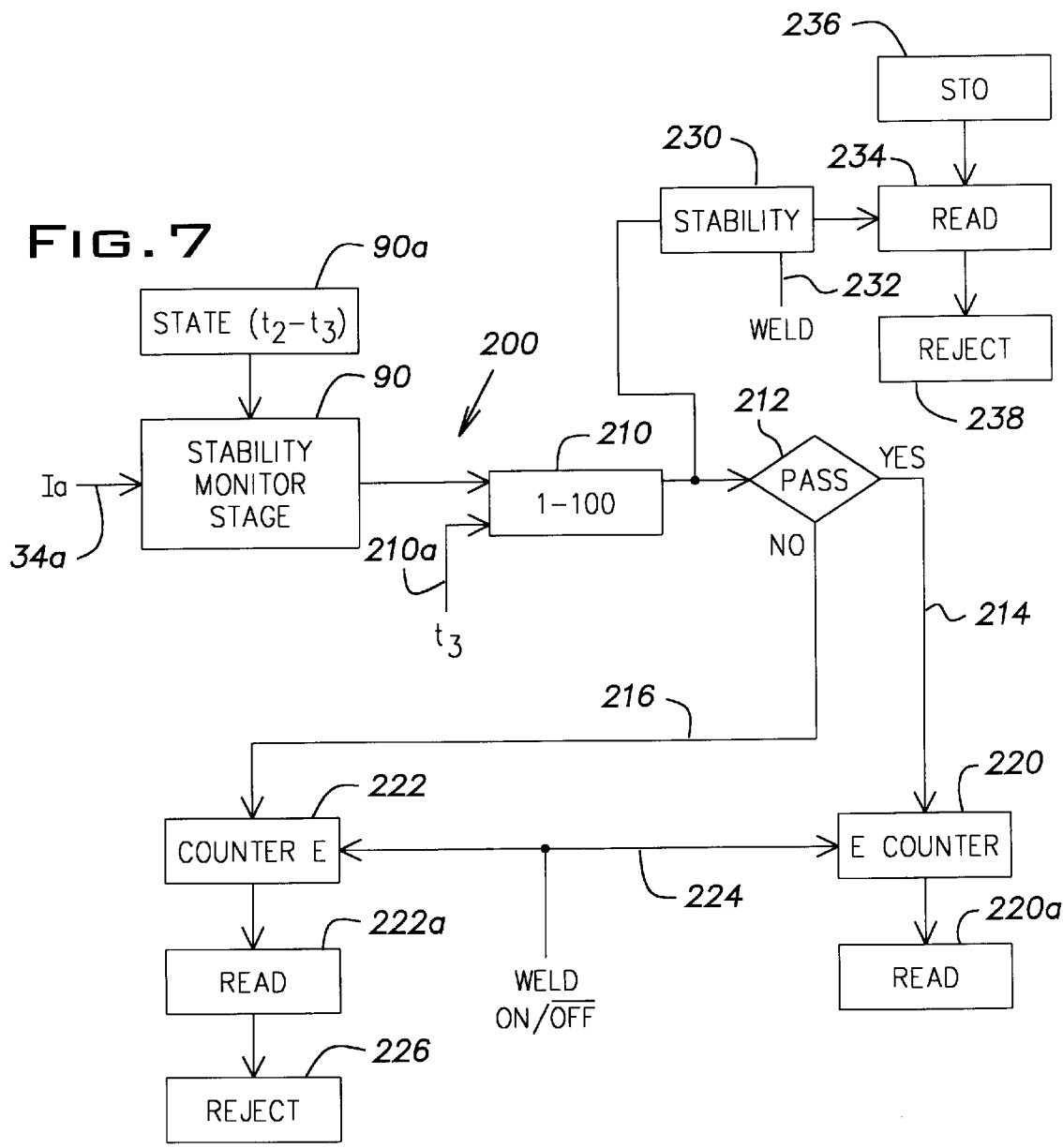
FIG. 7 is a block diagram and computer flow chart or program illustrating processing for stability during a selected state of the wave shape shown in FIGS. 2 and 3.

The invention monitors the level and/or stability of actual parameters for internal control signals during a selected state of the wave shape from generator 40 or during the total weld as explained in relationship to the disclosure in FIGS. 4 and 5. The inventive monitor as so far explained provides data for use in analyzing the weld cycle or the total operation of the welder over a work period of time. Various analysis programs are used to process data after the data has been determined and stored. In accordance with the preferred embodiment of the invention, the stability data from monitor stage 90 is analyzed by two programs as shown in FIG. 7. It is within the skill of the art to analyze the stability data in a variety of computer programs for recording, display and process intervention or evaluation. In the illustrated embodiment, analysis program 200 uses the results of monitor stage 90 of monitor M. As an example the program 200 is operated during monitoring of the time state between times $t_2$–$t_3$, which is the current peak portion of the wave shape as shown in FIGS. 2 and 3. Analysis program 200 is shown as computer flow chart showing two systems employed to analyze the results of the stability stage 90 during the peak current state where the statistical standard deviation of actual current in line 34a is calculated. In practice, there is a slight delay before the monitor stage 90 makes calculated deviations. The sample select feature to read $I_a$ during state $t_2$–$t_3$ but ignore $I_a$ otherwise is illustrated as sample selector or filter 90a. This program delay at the start of time segment $t_2$–$t_3$ incorporated in filter 90a allows the monitor to ignore fluctuations in the current which are experienced during each level shift in the various stages of the outputted wave shape. In the programmed flow chart shown in FIG. 7, the stability outputted from monitor stage 90 is read by the computer program shown as block 210 which is reset as indicated by the logic on line 210a at the end of each wave shape determined by the existence of time $t_3$. Consequently, the stability of each wave shape is captured by block 210. This captured stability data is processed in accordance with two separate analysis programs. The first program includes the pass analysis routine 212. If the stability for a given wave shape passes the desired threshold set in block 212, this information is outputted on line 214. If the particular wave shape has a stability less than a desired threshold, a logic signal appears in line 216. Counters 220, 222 are enabled by the logic on line 224 during each of the weld cycles. Consequently, the stability pass signals for each of the wave shapes during the weld cycle are counted in either counter 220 or counter 222. Of course, the first portion of each state $t_2$–$t_3$ is ignored to allow the parameter $I_a$ to settle. The results of the two counters are read, stored or otherwise retained as indicated by the read block 220a, 222a, respectively. In accordance with an aspect of the implementation of the present invention, if the instability accumulated by counter stage 222 is beyond a desired number, the weld cycle is rejected as indicated by block 226. A second analysis implementation of computer program 200 shown in FIG. 7 is illustrated as block 230. This is a program enabled during the weld cycle. The total instability of the weld cycle accumulating during all wave shapes is analyzed as a total number wherein 100 is the most stable arc. The output of this stability accumulator and analyzing stage is read, stored or otherwise retained as indicated by block 236. If the reading stage 234 is below a set stability then the weld cycle is rejected as indicated by block 238. A person skilled in the art can design other programs for analyzing the results of the monitor M from stability stage 90. The computer program 200 exhibits two implementations to analyze the data on stability obtained by the present invention. Two implementations can be selectively enabled (either one or the other or both) depending on the nature of the arc stability or weld quality problem the monitor is configured to detect. The advantage is the reading of stability in only selected states of the wave shapes. Otherwise, stability over a variable pulse is not obtainable.

Figure 8:
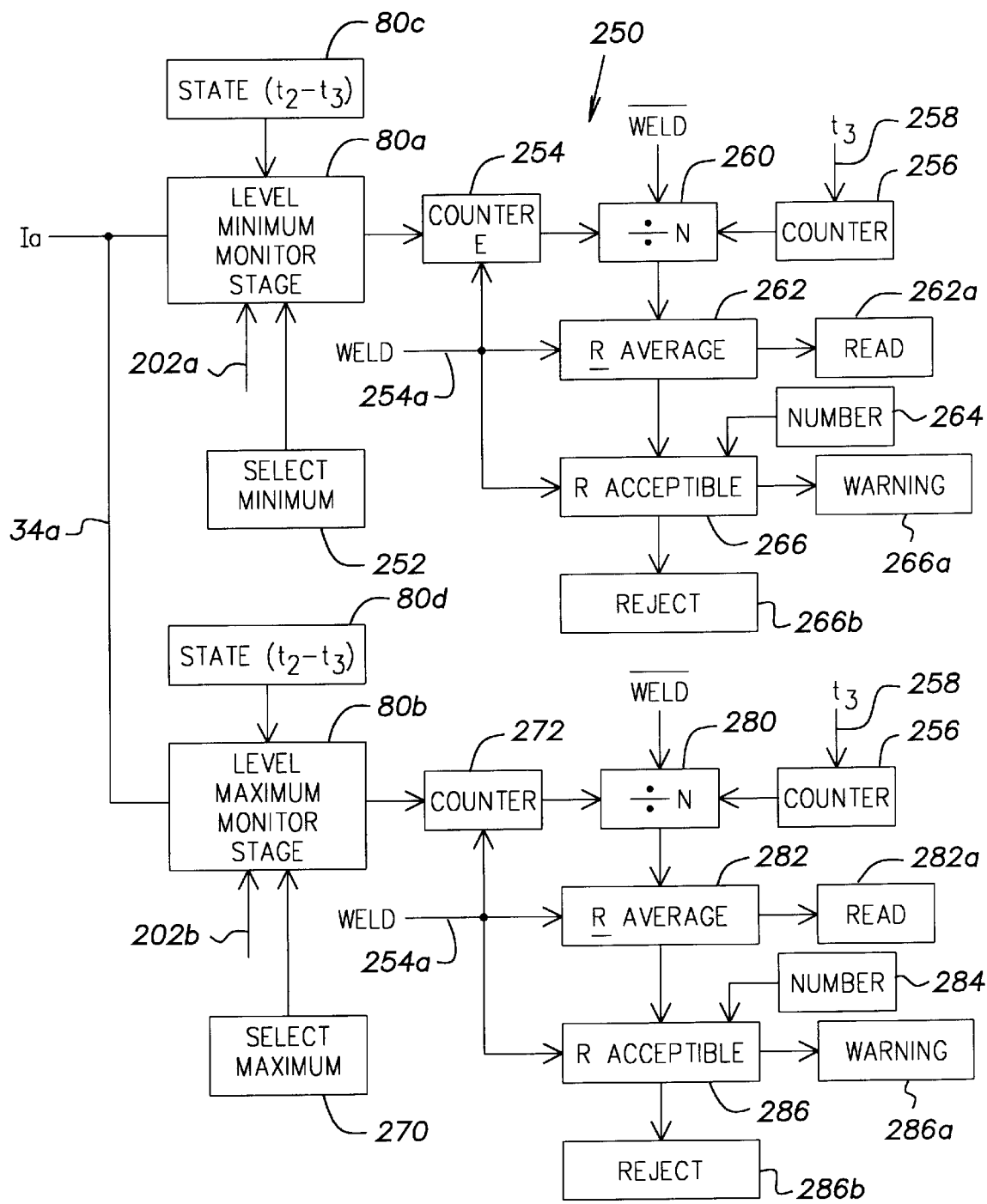
FIG. 8 is a block diagram and computer flow chart or program to process information from the level monitor stages of the preferred embodiment of the invention.

In accordance with another aspect of the present invention, monitor M determines the level relationship between the actual parameter and/or signal and the desired command signal from generator 40. For example, it is found that level monitor on current segment(s) is sensitive/effective to detect wire off center of the joint. It is also found that level detector on the output of PID/feedback controller (arc length control or wire speed control) is very effective to detect if the condition exceeds the dynamic range of regulation. In the case of arc length regulation, a welding program may be designed around ¾ stickout and arc length control can only adapt to stickout change from ½ minimum to 1" maximum. If welding below ½ stickout, GSF (output of feedback controller) will be pegged at maximum level, an indication that the welding program is incapable of regulating arc length and thus poor arc stability results. The level relationship from the monitor is the primary advantage and feature of the invention. In accordance with the preferred embodiment, the computer program for analyzing the results of level monitor stage 80 of monitor M is shown in FIG. 8. In this illustrated embodiment, level analysis program 250 processes the output from monitor level stage 80 in two separate routines, identified as a minimum monitor stage 80a with filter 80c and a maximum monitor stage 80b with filter 80d. Either one of these stages can be used separately or, in practice, they are combined. Subsection 80a relates to the determination of transitions 186 shown in FIG. 6 which is an event where the actual parameter is below the threshold minimum 182. The minimum level on line 202a from generator 40 is used when stage 80a is selected by program step 252. These events are counted by block 254 for each of the weld cycles as indicated. The counter is enabled during the weld cycle by the logic on line 254a. Counter 254 is a running total of the wave shapes used in a weld cycle. The number of wave shapes is obtained by counting the occurrences of time $t_3$ from the output of generator 40 as indicated by line 258. As indicated before, the first part of the state is generally ignored to remove normal inconsistencies at the start of any particular state. Block 260 is the computer flow chart subroutine for dividing the accumulated minimum events 186 from monitor stage 80a divided by the number N from the counter 256. This provides an average of minimum transitions during the weld cycle, which is provided to subroutine 262. The average minimum transitions are read, stored or otherwise outputted as indicated by block 262a. If the average is above a certain threshold number provided by the wave generator or by the program step 264, program routine 266 determines that the weld cycle is unacceptable. If acceptable, no action is taken. However, if the acceptable routine 266 determines that the average is merely approaching the number 264, a warning signal is provided by block 266a. Total unacceptability provides a weld reject signal by routine 266b. A person skilled in the art can devise other computer programs for effecting the analysis of the minimum current deviation or transition of the actual parameter as it relates to a set threshold. In FIG. 8, the maximum monitor stage 80b operates in conjunction with the minimum stage 80a. The maximum level is on line 202b from generator 40 and is used when stage 80b is selected by program 270. Like data information and programming retains the same numbers. Counter 272 counts the number of events 184 during the state $t_2$–$t_3$. Subroutine 280 provides the average of events 184 during the various wave shapes formed during the weld cycle. This average in block 282 is read, stored or otherwise used as indicated by block 282a. In block 286, the acceptability subroutine is processed wherein the number indicated by block 284 outputted from generator 40 or otherwise implemented by computer program is compared with the average from block 282 to provide a warning signal as indicated by block 286a when the average approaches the set number indicated by block 284. If the number is reached, a reject subroutine is implemented as indicated by block 286b. In practice, the stage 80a and stage 80b are implemented together and the average of both transitions from blocks 262 and 282 are analyzed by a read, acceptable number to give a warning and/or a rejection of a given weld cycle. Consequently, in practice, minimum level deviations are analyzed, maximum level deviations are analyzed, and total level deviations are analyzed. All of this is accomplished by the computer program as schematically illustrated in FIG. 8. The level stages 80a, 80b output level conditions which are stored and/or displayed as discussed with report logic 82.

Figure 9:
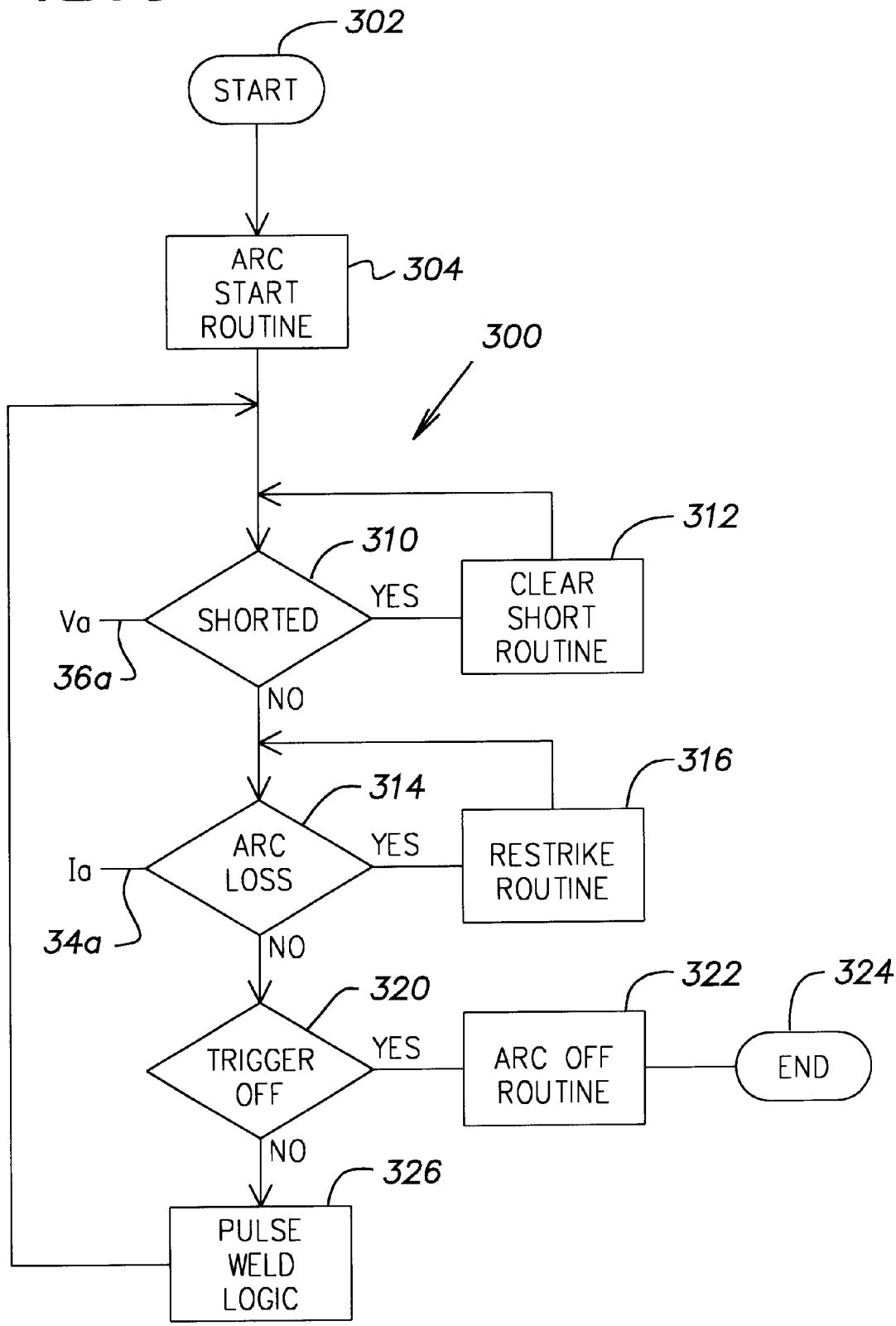
FIG. 9 is a flow chart or computer program used when implementing the present invention in a pulse weld process.

The computer program or flow chart 300 shown in FIG. 9 processes the invention when the welding cycle is a pulse weld cycle using a Motorola 683XX series general purpose microprocessor as the supervisory processor and a Texas Instrument Digital Signal Processor (DSP) as the wave form generator 40. The various computer manipulation and programs set forth herein are processed by the Motorola general purpose microcontroller; however, the next generation for outfitting the Power Wave welder schematically illustrated in Blankenship 3,278,390 is a RISC based processor, such as the Motorola PowerPC family. Irrespective of the digital processor used, the invention is implemented as set forth in the programs of this disclosure with modifications easily made by a person skilled in the art. In FIG. 9, the weld cycle is started as indicated by start pad 302. This initiates the arc start routine 304. During the pulse weld process utilizing the invention, there are exceptions which may occur sporadically during the weld cycle. Some of the exceptions are unwanted shorts and extinguished arc. Consequently, the flow chart implementing the present invention includes the exception interrogation and processing in FIG. 9 during implementing the pulse weld cycle. After the arc is started, the voltage on line 36a is interrogated. If this voltage is below a threshold, indicating a short, decision block 310 initiates a clear short routine 312. If the repetitive inquiry of line 36a is negative, the program advances to the arc loss decision block 314 to interrogate the arc current in line 34a. If the current is below a threshold, the arc has been extinguished. This initiates restrike routine 316 to reestablish the arc. If the interrogation block 314 is negative, then the program checks to determine if the weld cycle has been terminated. This is decision block 320. If the trigger is off, an arc off routine 322 is implemented to end the weld cycle as indicated by pad 314. These exception inquiries are made routinely throughout the implementation of the pulse weld logic 326, shown in more detail in FIG. 9B. During this pulse weld cycle, the exceptions are routinely and repetitively inspected for purposes of clearing all exceptions. This is standard practice in pulse welding. The invention involves the implementation of the pulse weld logic 326 shown in FIG. 9 and in detail in FIG. 9B.

Figure 9A:
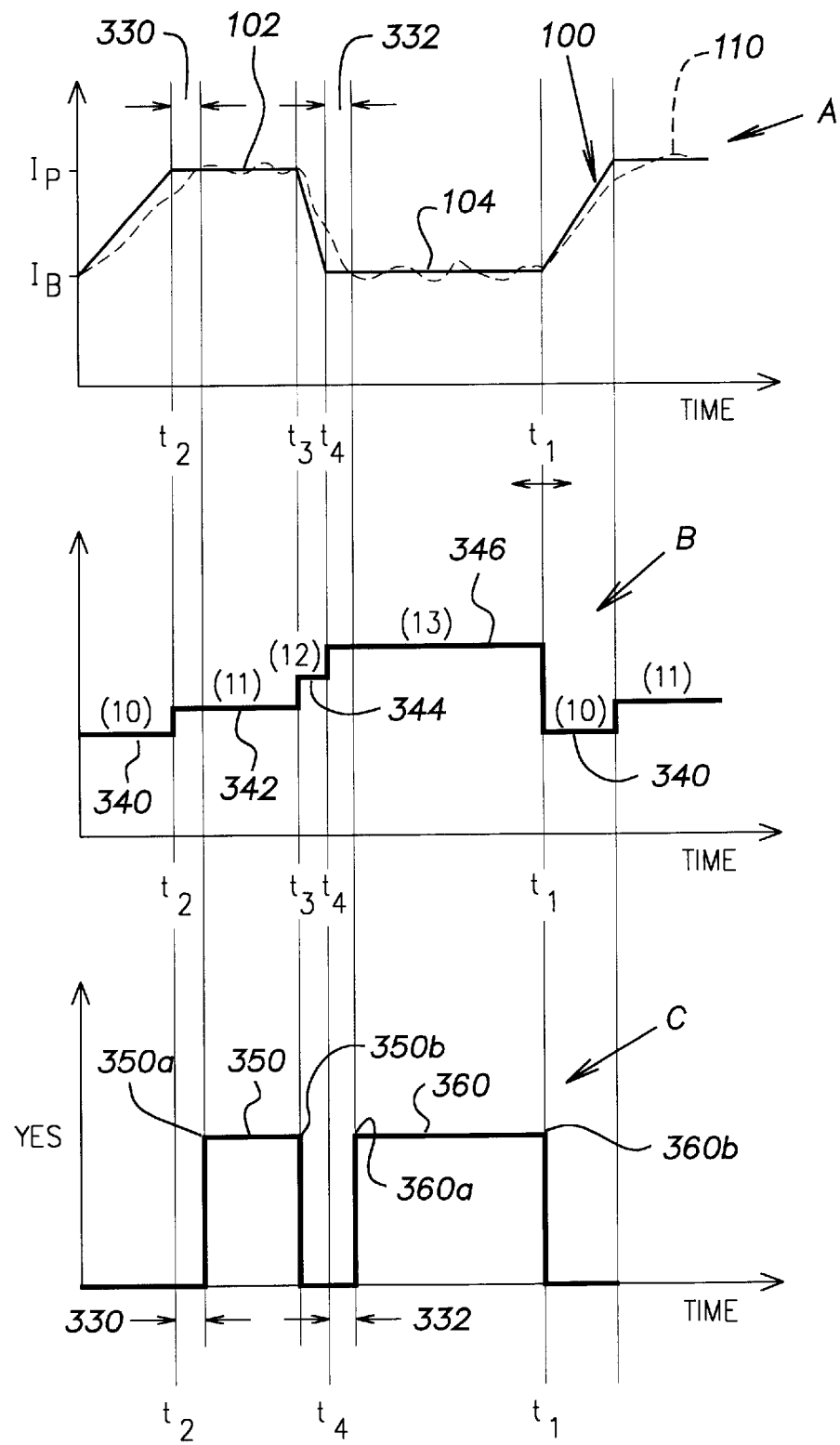
FIG. 9A is a time graph showing the output of the logic state controller for the wave shape generator to provide a pulse weld.
Figure 10:
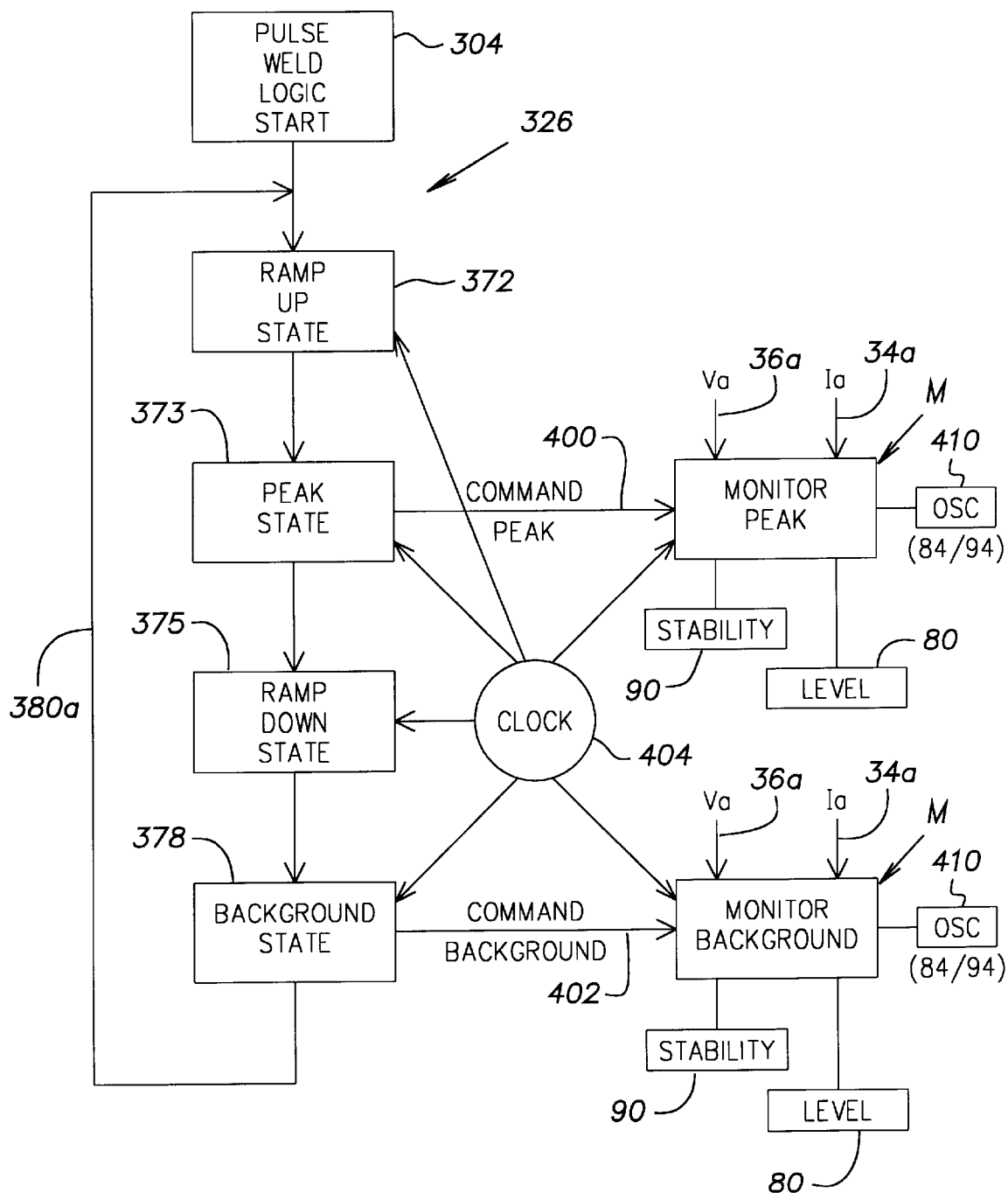
FIG. 10 is a computer flow chart utilizing the implementation of the invention shown in FIGS. 9 and 9A together with the monitoring states used in practicing the present invention.

Referring now to FIG. 9A, the output of logic state controller 60 is explained. Three curves A, B and C are illustrated in synchronization with a common time base. Curve A is essentially the same as the curves shown in FIGS. 2 and 3 and contain the same number identifying like portions. In curve A, functional states (10)–(13) are outputted from wave shape generator 40 and identified by the state logic controller 60, as illustrated by curves B, C. In practice, the output of the wave shape generator includes an identified time delay 330 at the start of the peak current portion 102 and a delay 332 at the start of the background current portion 104. The output of the state logic controller identifies states (10)–(13) informing monitor M to initiate the rapid testing of the actual parameters to the outputted parameters from curve A. Of course, there is a curve A for all of the parameters to be monitored even though only curve A for the actual current is illustrated in FIG. 9A. The level of the signal from controller 60 tells the monitor which state is to be read. As can be seen, the levels 340, 342, 344 and 346 are indicative of particular states being monitored. Curve C synchronizes the operation of the monitor and includes digital logic including a pulse 350 for initiating monitoring of state (11) corresponding to the peak current portion of the pulse wave shape. Of course current or voltage or other parameters are monitored at that time. Pulse 350 has a leading edge 350a which is a delay after time $t_2$ by time delay 330. Trailing edge 350b is at time $t_3$. Consequently, monitor M monitors the peak current portion of the wave shape only during the time of pulse 350. This takes into consideration the unstable portion at the start of this state. In a like manner, state (13) is monitored during logic pulse 360 having a leading edge 360a and a trailing edge 360b. The leading edge occurs after time delay 332 for stability purposes. These wave shapes are implemented by the pulse weld logic 326 implemented by the state logic controller 60 shown in FIG. 1. Referring now to the detailed pulse weld logic 326, shown in more detail in FIG. 9 wherein state (10) is monitored against an ever increasing current between time $t_1$ and time $t_2$, shown in FIG. 9A. The program continues to inquire as set forth in decision block 372 if time $t_2$ has been reached. If time $t_2$ has not been reached, the ramp up program continues increasing the command signal, which command signal is compared with an actual signal. In practice, the voltage and current of state (11) and the current voltage and duration of state (13) are monitored by monitor M. If the time exceeds $t_2$ then state (11) is implemented as indicated by program 373. During this program, if there is a short indicated by decision block 310 the clear short routine 312, as shown in FIG. 9, is implemented. When the inquiry of time indicates that time $t_3$ has been reached during decision block 374, the monitor processes state (12) as indicated by program 375. In practice, this state is not monitored. If the state logic controller interrogating time identifies that the time is in excess of $t_4$, as indicated by decision block 376 the background state (13) is implemented as indicated by program block 378. Again, a decision block 310 senses a short. If there is a short, it is cleared by block 312. When state logic controller 60 determines that the time is greater than $t_1$ as indicated by block 380, the pulse weld process is looped as indicated by line 380a. The same process is used for other weld processes to monitor selected states of the wave shape from generator 40. Pulse welding as so far described is illustrative of capabilities of monitor M when associated with or used as a computer outside of welder 10 as shown in FIG. 1. In the preferred embodiment and in practice, the monitor is associated specifically with the welder and the welder is one as shown in Blankenship 5,278,390. Implementation of the program shown in FIG. 9 with the detail program of FIG. 9B and the resulting graphs shown in FIG. 9A are tied together with the monitor as shown in FIG. 1 in an architecture shown in FIG. 10. The number of components already described are retained for consistency. This layout illustrates the overall implementation of the computer program used in practicing the invention. Monitor M is shown in two stages monitoring the peak by the command signals from line 400 or monitoring the background by command signals in line 402. Clock 404 implements the program for indexing wave shapes at a desired rate so that the monitoring can occur at a high rate indicated by oscillators 410. The command signals are compared with the actual parameters by the monitor M and are read at a high speed indicated by oscillator 410. Outputting the command signals for specific state in the wave shape for comparison with actual parameters to provide level monitoring or stability monitoring of the parameters during a state is done at a high rate with the microcontroller of the welder.

The invention involves designating states in the wave shape outputted from generator 40.

Figure 11:
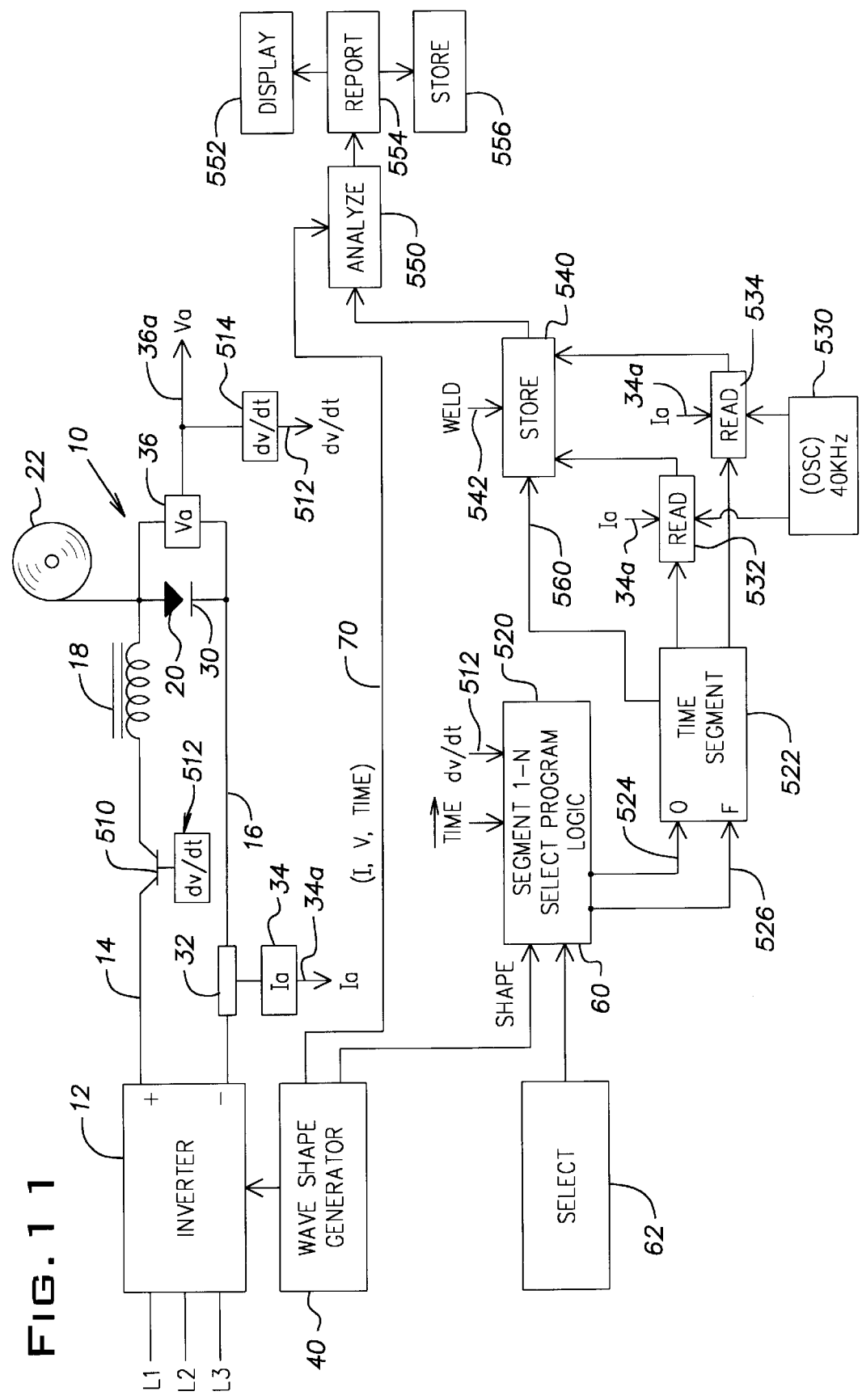
FIG. 11 is a flow chart similar to FIG. 1 for implementing the preferred embodiment of the invention when an STT welding has been selected.
Figure 12:
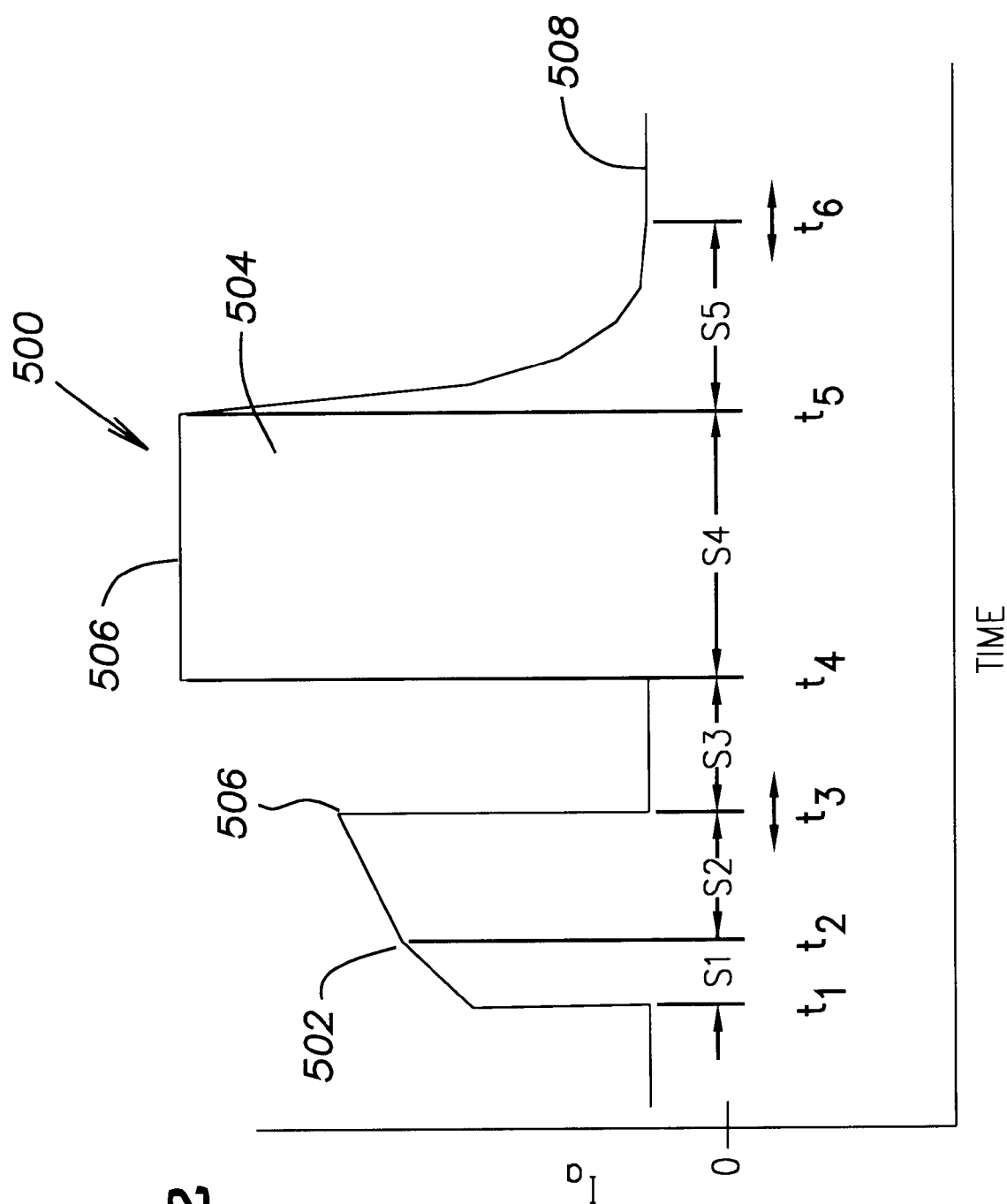
FIG. 12 is a current curve of an STT weld process showing segmentation of the STT by the wave shape generator into states for practicing the present invention.

It has been described with respect to the wave shape of a pulse weld process; however, the invention can be used with most wave shapes used in welding processes. FIGS. 11 and 12 disclose the use of the invention for monitoring wave shapes of an STT welding process, having a wave shape as shown in FIG. 12, This description illustrates how the time duration of a given state is a monitored parameter. Welder 10 is operated in an STT welding mode having a wave shape 500 shown in FIG. 12. This wave shape includes segments or states S1-S5 with states S1 and S2 constituting the short condition which has a variable duration determined by the instant the fuse is broken to separate metal from the shorted wire. This is represented by the variable time $t_3$. The short circuit pulse 502 precedes plasma boost pulse 504 constituting a peak current 506 with a tailout to the background current 508. Point 506 is the dv/dt point that determines time $t_3$. Welder 10 of FIG. 11 has an added switch 510 with a dv/dt control line 512 from detector 514. A logic in line 512 terminates short circuit pulse 502 and locates the time $t_3$. This variable time also affects the frequency of the short circuit conditions in the STT welding process. Logic controller 66 is shown as selector program logic 60. The desired segment or state of the STT wave shape is selected as indicated by block 62. The time segment is processed as indicated by block 522 to turn on the monitor by the logic on line 524 and turning off the monitor by the logic on line 526. These logics are all computer programs as previously disclosed. They are correlated to states of the wave shape.

When the short condition 502 is monitored, segments S1 and S2 are selected. They terminate upon receipt of a signal in line 512. High speed oscillator 530 activates the read operation or program 532, 534 for reading the actual current and actual voltage at a rapid rate illustrated as 40 kHz. The results of the instantaneous reading of the parameters are stored as indicated in block 540. The level and stability is analyzed by program 550 in accordance with the command signals in interface 70. The result is displayed at block 552, reported at block 554 and/or stored at block 556. This operation occurs during the total weld cycle indicated by the logic on line 542. In the STT wave shape, as in the other wave shapes processed by the present invention, the duration of the monitored wave shape is compared to an outputted command time indicated by the "TIME" data in interface 70. The nominal duration time provided by interface 70 is compared with the actual duration time on line 560. This information is also stored at block 544 analysis, display, reporting and storing. This same concept is employed for the embodiment of the invention illustrated with respect to the monitoring of a pulse wave shape, such as shown in FIGS. 2 and 3. This same duration monitoring is employed in state (13) of the wave shape shown in FIG. 9A.

Figure 13:
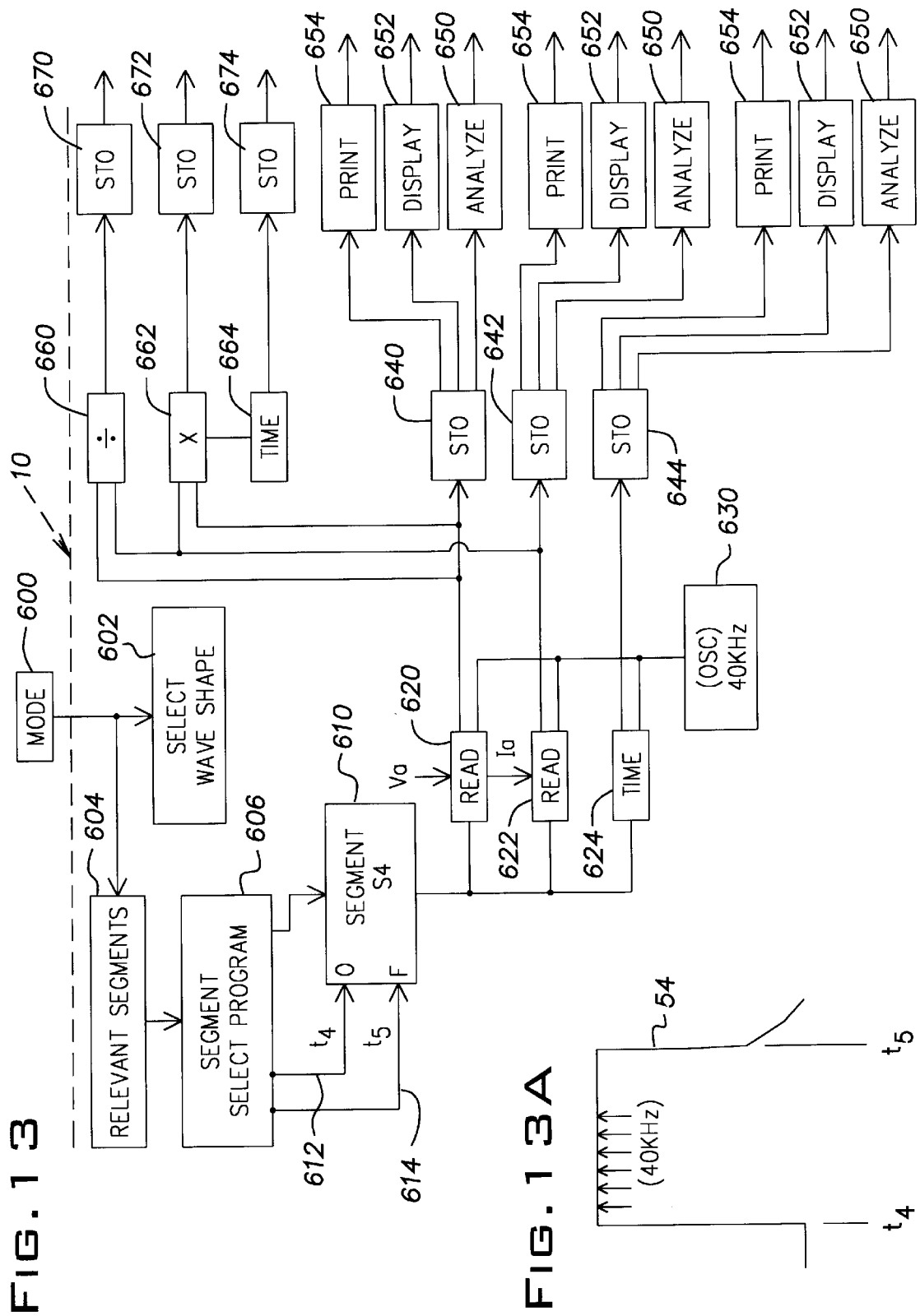
FIG. 13 is an expanded flow chart or computer program used in practicing the preferred embodiment of the present invention.

The present invention employs a variety of calculations and procedures for using the monitored information obtained by use of the invention. A representative system illustrating this versatility is shown in FIG. 13 for monitoring the power boost peak current of time segment S4 shown in FIG. 12. This time segment or state is one of many states of a wave shape that can be monitored using the program set forth in FIG. 13. The weld process to be performed by welder 10 is selected by the mode select 600. This implements the desired wave shape for the welding process as indicated by block 602. The relevant segments are provided in block 604 for selection as indicated in the program block 606. In the illustrated system, segment S4 is selected and is monitored as indicated by block 610. Logic on line 612 activates the monitoring process for a given wave shape. The monitoring process of a wave shape is terminated by the logic on line 614. The logic on line 612 is normally delayed slightly to allow the parameters to be stabilized. During the selected time segment or state of each wave shape being processed, the voltage is read as indicated by block 620, the current is read as indicated by block 622 and the time duration between the logic on lines 612 and 614 is recorded for each wave shape at block 624. Time is fixed for segment S4. However, a variable segment would have variable durations read by block 624. The reading operation occurs at a high rate, in practice, 40 kHz. This is the output of software oscillator 630. The results of the reading operations are stored in block 640, 642 and 644, respectively. All of these blocks are subject to the previously described analysis. The data is stored, reported and otherwise used. These functions are indicated as blocks 650, 652 and 654 for each of the stored information blocks. In the illustrated embodiment, the voltage and current are divided to obtain the arc resistance, which quotient is stored at block 670. By multiplying the two parameters, the power is obtained and is stored at block 672. Determining power over a period of time provides energy that is stored at block 670. The repetitive readings are instantaneously calculated by blocks 660–662 and the readings are stored as indicated by blocks 670–674. The information of these blocks is analyzed, printed, stored and otherwise used in determining the operating characteristics of welder 10 during a weld cycle.

Figure 14:
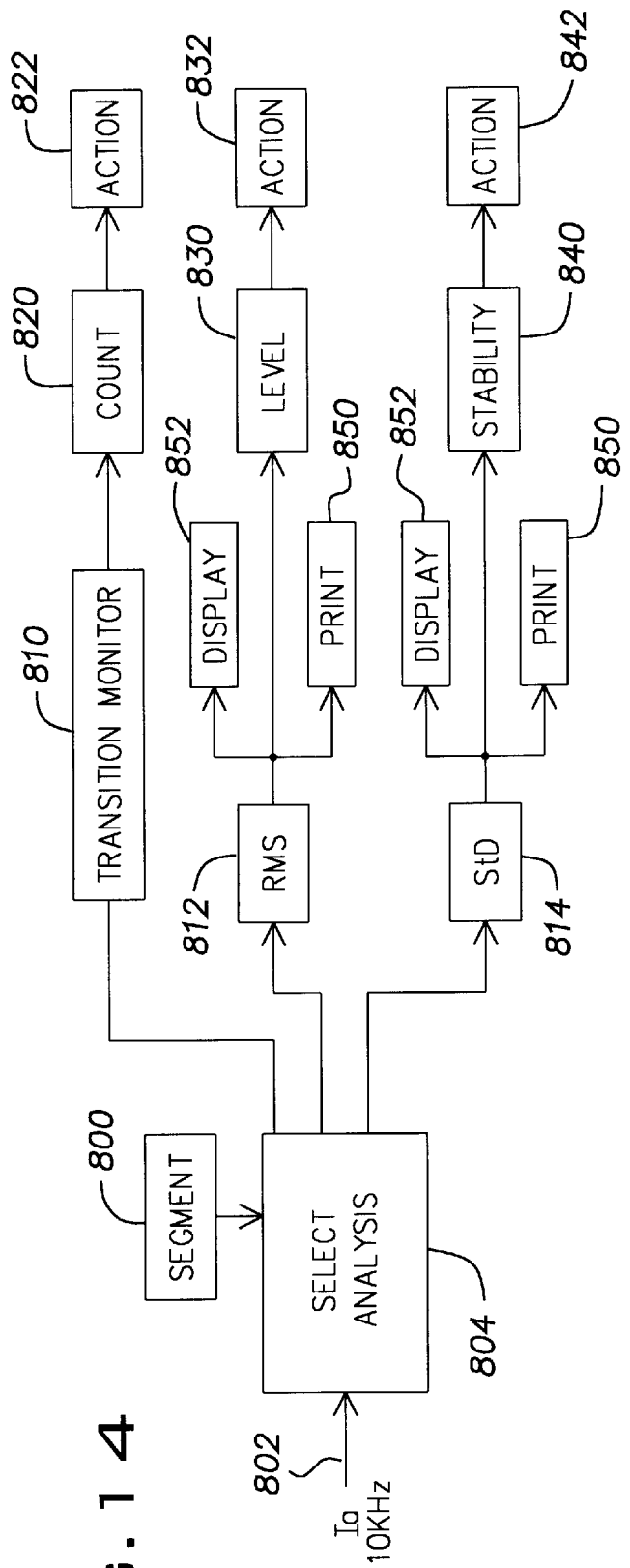
FIG. 14 is an additional flow chart or computer program used in the preferred embodiment of the present invention for determining various parameters and relationships of the arc current when practicing the present invention.

The present invention is applicable for calculating the plurality of characteristics of the welding process. A program or system used for this purpose is illustrated in FIG. 14 wherein the data for the information for a particular time segment is selected or a group of time segments are selected as indicated by block 800. In the illustrated system the arc current in the form of a number of arc current readings at a high rate on line 802 are received for analysis. These readings are directed to block 804 for determining certain selected weld characteristics. In this illustrated embodiment, transitions of the value of the readings are detected as indicated by block 810 and these transitions are counted as indicated by count block 820 for appropriate action after a weld cycle. This transient monitor is a totalization of the level monitors previously described wherein the current above and below certain levels are recognized and counted. The action block 622 takes the various remedial and cognizant actions previously described. In this system, the root mean square is calculated and outputted at the desired counting rate into block 812. Block 814 calculates the standard deviation or absolute deviation as previously described. Testing the level of the root mean square is determined by a detector 830 which is used to take the appropriate action as indicated by block 832. In a like manner, the standard deviation calculated at block 814 is recorded as stability in block 840 for appropriate action as indicated by block 842. These two calculations, which are done at a rapid rate as indicated by the oscillator for the monitor, are printed as indicated by block 850 or stored as indicated by block 852 or otherwise employed for recording and storing desired information for the various weld cycles processed by welder 10.

Figure 15:
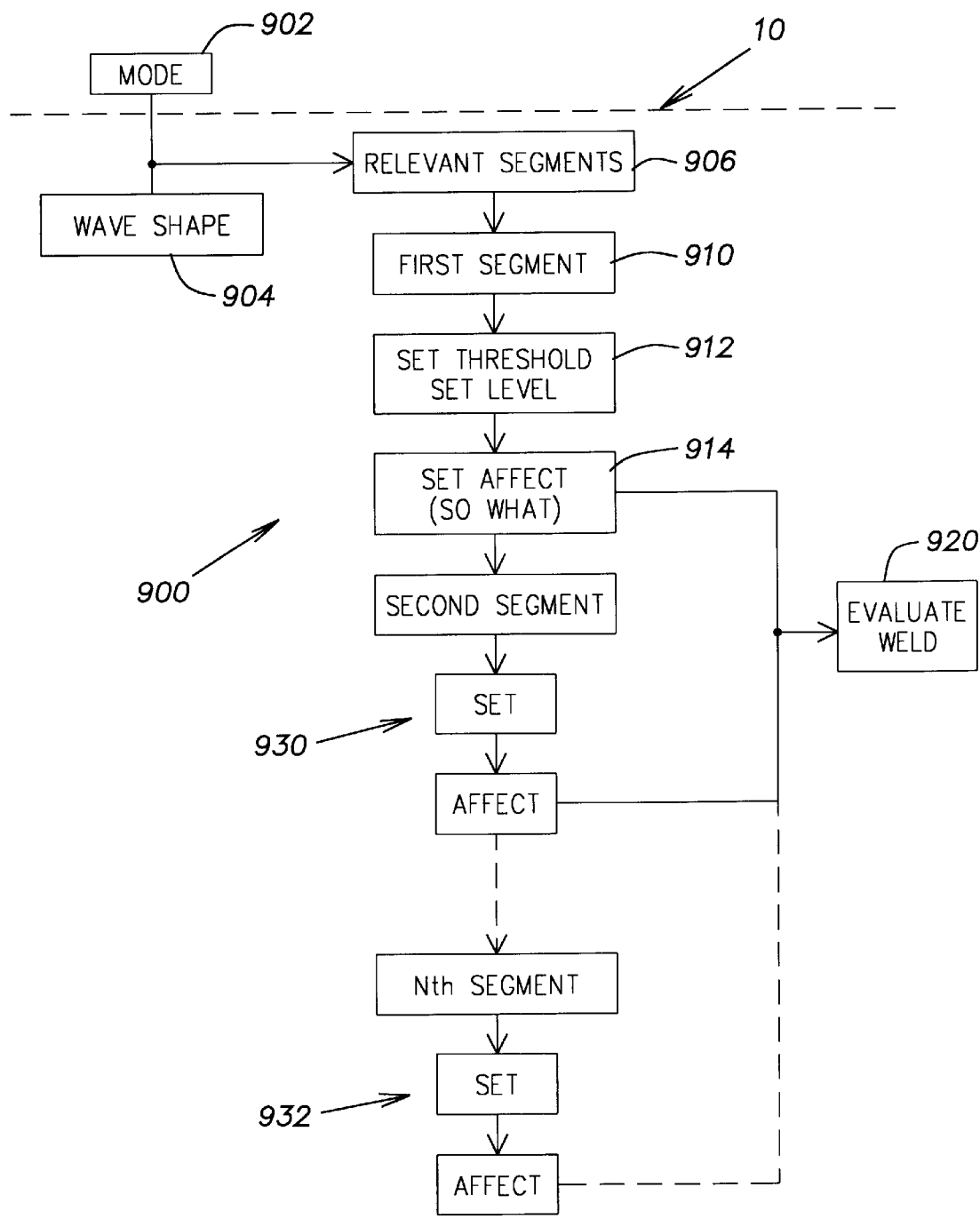
FIG. 15 is a flow chart and block diagram of a computer subroutine for calculating a reject condition for a weld being monitored by the present invention.

When a segment or state is selected for level monitoring or time monitoring various thresholds are set by the program of the welder. This is schematically illustrated in FIG. 15 wherein a program 900 is illustrated for recognizing the selected welding process by the logic or information in block 902. This selects a wave shape as indicated by block 904 in accordance with standard practice. The relevant segments of time, i.e. states, to be monitored are then selected by the program as indicated by block 906. For pulse welding this may be the peak current, the background current and the duration of the background portion of the wave shape. The first segment is selected as indicated by block 910 and the thresholds for detecting level variations are set as indicated by block 912. Thereafter, the appropriate use of the results of the output from monitor M are set in the program as indicated by block 914 for evaluating the total weld cycle as indicated by block 920. The second segment is set in the same manner as indicated by area 930. All the segments to be monitored up to the nth segment is set as described and indicated in area 932. After the program 900 is implemented, welder 10 processes the weld cycles while monitor M monitors the selected data output from the operation of the monitor.

A production log is obtained using the present invention. This is illustrated by program 950 in FIG. 16, wherein the mode for welder 10 is inputted by block 952. This selects the desired wave shape 954 to control the power supply 12 of welder 10. Accumulator 960 records the total weld time as indicated by line 962 as it relates to time in line 964 from block 966. In this manner, efficiency of the welder 10 over a period of time is calculated by a percentage algorithm 970 for recording in log 972. This log is operator specific as indicated by the input blocks 974, 976 for separate operators of a given welder 10. Other information can be recorded on log 972, such as the monitored parameters during any length of time. Such information is helpful in preventive adjustment of welder 10. In a like manner, it is also desirable to employ an accessory with welder 10 to obtain the ratio of plasma time to short circuits. This information is very helpful in short circuit type of welding, such as an STT weld process. Program 980 in FIG. 17 is used for obtaining this ratio. In program 980, comparator 982 has an input for the arc voltage 982a and a reference input 982b. A voltage above the reference indicates an arc condition. Selector network 990 has an output 990a indicative of an arc and an output 990b indicative of a short. This occurs when the voltage is less than the reference voltage in line 982b. Circuit 992 provides the relative time of arc to the short for percentage calculation in block 994. This information is recorded over a select period of time in log 996. The desired weld time being monitored is provided to the log 996 by the appropriate timing program 998.

Figure 18:
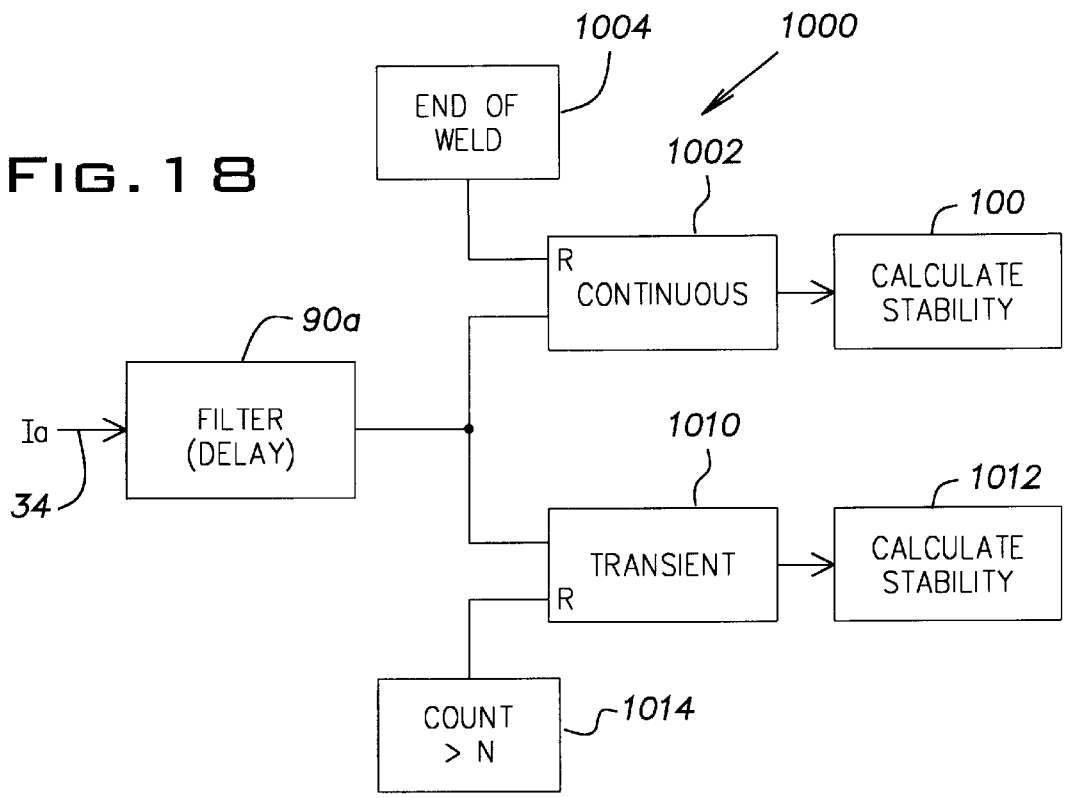
Figure 19:
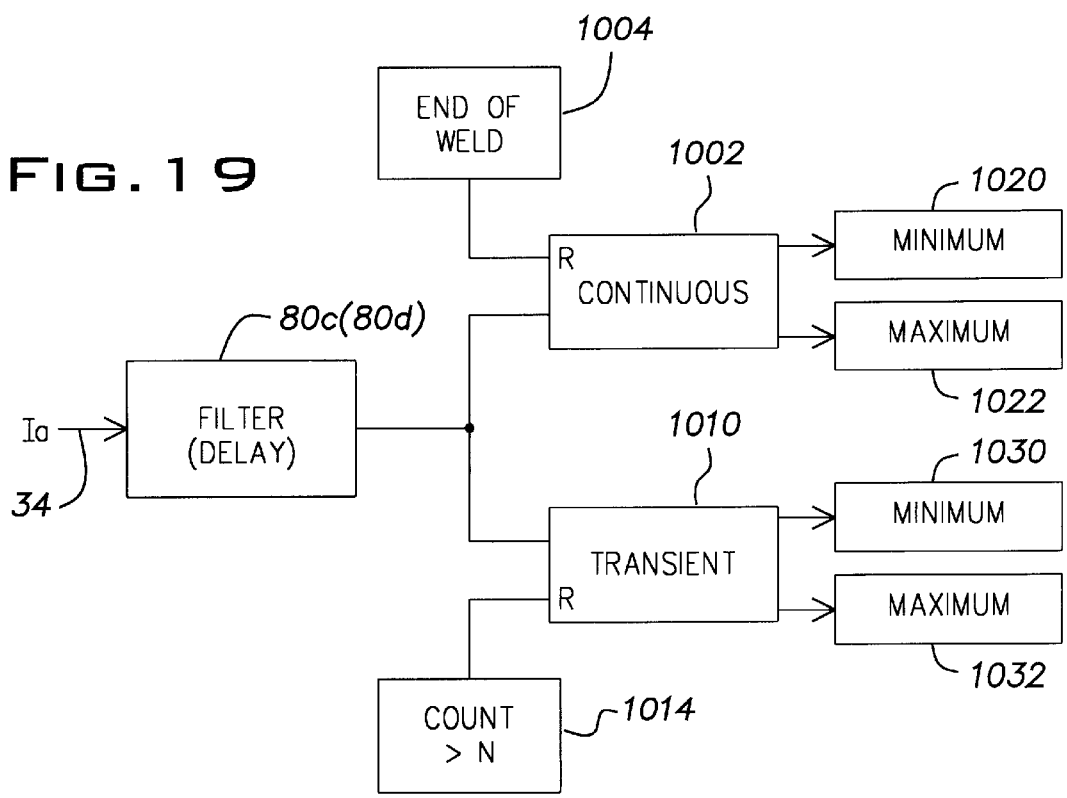

A general scheme used in the invention to illustrate a simplification of the program of FIG. 7 is illustrated in FIG. 18. The sample selector or filter 90a provides readings to stability program 1000 where continuous readings are taken by program 1002 for the total weld as controlled by program step 1004. This accumulated or average data is analyzed by the algorithm 1006 to determine stability of a parameter accruing during the state selected by filter 90a. In a like manner, the stability for a selected number of readings N is determined by accumulating and averaging the readings by program step 1010. This average data is analyzed by algorithm 1012. The period considered is controlled by reset program 1014 when the count exceeds the selected number N. A similar simplification of the detailed program in FIG. 8 is shown in FIG. 19 where like programs from the method of FIG. 18 have the same numbers. In the scheme of FIG. 19, the continuous accumulation and averaging of data is analyzed for deviation from a minimum routine 1020 or from a maximum by routine 1022. The transient data gathering step 1010 is analyzed for derivations from a minimum by routine 1030 or from a maximum by routine 1032. The results of the analysis by routines 1020, 1022, 1030, and 1032 are then recorded, read, stored, etc. as so far described. FIGS. 18 and 19 are presented to illustrate the broad nature of the process for using the data from time segments to control electric arc welders.

The invention is the monitoring of a welder. The time segments or states are areas of the wave shape being implemented by welder 10. Monitor M reads data during a selected state and uses this data for display, storage or other use. The welder includes a microcomputer which performs the program operations herein described. The term "circuit" is employed as an area of the computer program. The use of the word "circuit" indicates that a hardwired circuit could be used, but this is not done in practice. The "standard deviation" used in this invention is merely a manner of defining stability. Various stability programs are available and can be used. In practice, a root mean square deviation is used as a standard deviation or absolute deviation is determined. The terms "state" and "time segment" are used somewhat interchangeably. The "weld cycle" is a time when the welding operation is being performed. It is the time between a start and stop of a welding operation. Wave shapes and wave forms are used somewhat interchangeably. The "weld time" is synonymous with "weld cycle." The rapid rate of processing wave shapes means that during each state many measurements are taken. In practice, the rate is greater than 1 kHz and preferably 10 kHz or greater. The term "parameter" are the arc characteristics signals or functions that are normally measured in welding. They are, without limitation, arc current, arc voltage, time and wire feed speed. Internal are signals which are used in the welder to perform the welding operation. They are not normally obtainable at a welder. Computer, microprocessor, microcomputer are terms used interchangeably, since the processor does not form a part of the present invention. A "command signal" is a signal that is the desired level or characteristic of a parameter or internal signal. An arc characteristic is the stability, level or event signals monitored by monitor M. The term "read" and the term "store" are used in their broad sense meaning that data is read and data is stored. The term "analysis" means the use of the data from the monitor for creating the desired information to evaluate the welding operation.

In practice, the reading rate is as low as about 100 Hz for some signals. The current and voltage is normally read at a rate greater than about 1.0 kHz. The signals GSF and the PWM input is updated at about 100 Hz and the actual WFS is updated below 1.0 kHz depending upon the sensor 46c and the actual speed range.

Having thus defined the invention, the following is claimed:

1. A method of monitoring an electric arc welder as the welder performs a selected arc welding process by creating actual welding parameters between an advancing wire and a workpiece, said selected process controlled by command signals to the power supply of said welder, said method comprising:
    (a) generating a series of rapidly repeating wave shapes constituting a weld cycle with a weld time;
    (b) dividing said wave shapes into states; and,
    (c) detecting at a selected interrogation rate instances of level deviations by a selected weld parameter occurring in one of said wave shape states during said weld time.

2. A method as defined in claim 1 wherein said parameter is arc current.

3. A method as defined in claim 1 wherein said parameter is arc voltage.

4. A method as defined in claim 1 including:
    (d) counting said deviations during said weld time.

5. A method as defined in claim 1 wherein said selected rate is greater than about 7 kHz.

6. A method as defined in claim 1 wherein said selected rate is greater than abut 5 kHz.

7. A method of monitoring an electric arc welder as the welder performs a selected arc welding process by creating actual welding parameters between an advancing wire and a workpiece, said selected process controlled by command signals to the power supply of said welder, said method comprising:
    (a) generating a series of rapidly repeating wave shapes constituting a weld cycle with a weld time;
    (b) dividing said wave shapes into states; and,
    (c) measuring the stability of a selected weld parameter occurring in one of said wave shape states during said weld time.

8. A method as defined in claim 7 wherein said parameter is arc current.

9. A method as defined in claim 7 wherein said parameter is arc voltage.

10. A method as defined in claim 7 wherein said stability is the standard statistical deviation of said selected parameter.

11. A method as defined in claim 7 wherein said selected rage is greater than about 1 kHz.

12. A method as defined in claim 7 wherein said selected rate is greater than about 5 kHz.

13. A method of monitoring an electric arc welder as the welder performs a selected arc welding process by creating an internal signal for controlling the power supply or the wire feed speed of welding wire as it advances toward the workpiece, said method comprises:

(a) generating a series of rapidly repeating wave shapes constituting a weld cycle with a weld time;

(b) dividing said wave shapes into states; and, (c) measuring the stability for said internal signal during one of said states for said weld time.

14. A method as defined in claim 13 wherein said measure internal signal is the output result of a comparison of the value to an actual welding parameter with a reference value.

15. A method as defined in claim 13 wherein said measure internal signal is the speed control signal for said wire feed speed.

16. A method as defined in claim 13 wherein said measured internal signal is the output of a closed loop controller.

17. A method as defined in claim 13 wherein said stability measurement is a standard deviation of detections of said internal signal at a given rate.

18. A method as defined in claim 17 wherein said given rate is greater than about 1 kHz.

19. A method of monitoring an electric arc welder as the welder performs a selected welding process by creating actual parameters for said process, said method comprising:

(a) generating a series of rapidly repeating wave shapes constituting a weld cycle with a weld time;

(b) dividing said wave shapes into time states at least one of which has its time dependent on weld condition; and, (c) measuring the stability of said times of said one state for said weld time.

20. A method as defined in claim 19 wherein said stability measurement is standard deviation of said times.

21. A method of monitoring an electric arc welder as the welder performs a selected arc welding process involving a series of rapidly repeating wave shapes constituting a weld cycle with a weld time, said method comprising:

(a) creating a drive signal for a selected weld parameter during said weld cycle;

(b) detecting said weld parameter during said weld cycle at a selected rate greater than about 1 kHz; and, (c) measuring the stability of said detected parameter during said weld cycle.

22. The method as defined in claim 21 wherein said weld parameter is the speed signal to the wire feeder of said welder.

23. The method as defined in claim 21 wherein said rate is greater than about 5 kHz.

24. A method of monitoring an electric arc welder as the welder performs a selected arc welding process involving a series of rapidly repeating wave shapes constituting a weld cycle with a weld time, said method comprising:

(a) creating a drive signal for a selected weld parameter during said weld cycle;

(b) detecting said weld parameter during said weld cycle at a selected rate greater than about 1 kHz; and, (c) measuring and recording the level of said weld parameter during said weld cycle.

25. The method as defined in claim 24 wherein said weld parameter is the speed signal to the wire feeder of said welder.

26. The method as defined in claim 24 wherein said rate is greater than about 5 kHz.

27. A monitor for an electric arc welder as the welder performs a selected arc welding process by creating actual welding parameters, such as arc voltage and arc current, between an advancing welding wire and a workpiece, said process involving an arc and being defined by a series of rapidly repeating wave shapes of command signals for said parameters constituting a weld cycle with a cycle time, said monitor comprising: a logic state controller for segmenting each of said wave shapes into a series of time segmented states, a circuit for selecting a specific wave shape state, a reader device for reading one of said actual parameters periodically at a rate generally greater than 100 Hz during said selected state only, and a circuit to compare said actual parameter with said command signal for said parameter and a circuit to generate a characteristic of said weld process during said selected state based upon said comparison.

28. A monitor for an electric arc welder as the welder performs a selected arc welding process by creating actual weld parameters between an advancing welding wire and a workpiece, said process controlled by command signals to the power supply of said welder, said welder controlled by a wave shape generator for creating a series of rapidly repeating wave shapes constituting a weld cycle, said monitor comprising: a logic state controller for segmenting each wave shape into wave shape time states and a device for measuring at a rage of over 100 Hz and recording level deviations of a selected weld parameter during a selected one of said wave shape states.

29. A monitor for an electric arc welder as the welder performs a selected arc welding process by creating actual weld parameters between an advancing welding wire and a workpiece, said process controlled by command signals to the power supply of said welder, said welder controlled by a wave shape generator for creating a series of rapidly repeating wave shapes constituting a weld cycle, said monitor comprising: a logic state controller for segmenting each wave shape into wave shape time states and a device for measuring at a rate over 100 Hz and recording statistical deviations of a selected weld parameter during a selected one of said wave shape states.

30. A monitor for an electric arc welder as the welder performs a selected arc welding process by creating actual weld parameters between an advancing welding wire and a workpiece, said process controlled by command signals to the power supply of said welder, said welder controlled by a wave shape generator for creating a series of rapidly repeating wave shapes constituting a weld cycle, said monitor comprising: a logic state controller for segmenting each wave shape into wave shape time states and a device for measuring at a rate over 100 Hz and recording deviations of a selected weld parameter from the running average of a selected parameter during a selected one of said wave shape states.

31. A monitor for an electric arc welder as the welder performs a selected arc welding process by creating actual welding parameters, such as arc current and arc voltage, between an advancing welding wire and a workpiece, said process involving an arc and being defined by a series of rapidly repeating wave shapes constituting a weld cycle with a cycle time, said monitor comprising a controller for segmenting each wave shape into time states having command signals corresponding to said actual parameters and a time duration, a device for selecting a specific wave shape state, a device for reading said time duration, a circuit for comparing said actual read duration with a function of said command signal corresponding to desired time duration and using this comparison to generate a characteristic of said welding process during said selected state.

* * * * *